(12) United States Patent
Mantri et al.

(10) Patent No.: US 8,156,778 B2
(45) Date of Patent: Apr. 17, 2012

(54) MULTIPLE CHANNEL DIGITAL SUBSCRIBER LINE FRAMER/DEFRAMER SYSTEM AND METHOD

(75) Inventors: Ravi G. Mantri, Portland, OR (US); Christopher R. Hansen, Grass Valley, CA (US); Terry C. Brown, Austin, TX (US)

(73) Assignee: Metanoia Technologies, Inc., Austin, TX (US)

( * ) Notice: Subject to any disclaimer, the term of this patent is extended or adjusted under 35 U.S.C. 154(b) by 0 days.

(21) Appl. No.: 12/790,690

(22) Filed: May 28, 2010

(65) Prior Publication Data

US 2010/0246585 A1  Sep. 30, 2010

Related U.S. Application Data

(63) Continuation of application No. 11/264,677, filed on Nov. 1, 2005, now Pat. No. 7,729,384.

(51) Int. Cl.
*H04J 3/00* (2006.01)
(52) U.S. Cl. ............................ 70/476; 375/219; 714/774
(58) Field of Classification Search ................... 370/476; 375/222, 260; 714/762, 784
See application file for complete search history.

(56) References Cited

U.S. PATENT DOCUMENTS

| | | | |
|---|---|---|---|
| 6,219,816 B1 * | 4/2001 | Tezuka | ........................... 714/784 |
| 6,498,808 B1 | 12/2002 | Tzannes | |
| 6,801,570 B2 | 10/2004 | Yong | |
| 7,409,626 B1 | 8/2008 | Schelstraete | |
| 2005/0185706 A1 * | 8/2005 | Heller et al. | .................. 375/222 |
| 2006/0093023 A1 | 5/2006 | Brown et al. | |
| 2008/0037666 A1 | 2/2008 | Tzannes | |
| 2008/0092013 A1 * | 4/2008 | Hollums | ....................... 714/762 |
| 2009/0067523 A1 * | 3/2009 | Tzannes | ........................ 375/260 |

* cited by examiner

*Primary Examiner* — Albert T Chou
(74) *Attorney, Agent, or Firm* — Lee & Hayes, PLLC

(57) ABSTRACT

The framer, also referred to as the scrambler/Reed-Solomon encoder (SRS), is a part of the transmitter and accepts user and control data in the form of one or more logical channels, partitions this data into frames, adds error correction codes, randomizes the data through a scrambler, and multiplexes logical channels into a single data stream. The multiplexed data is then passed to the constellation encoder as the next step in the formation of the VDSL symbol. The deframer, also referred as the descrambler/Reed-Solomon decoder (DRS), is part of the receiver and performs the inverse function of the framer. Disclosed is a highly configurable hardware framer/deframer that includes a digital signal processor interface configured to provide high level control, a FIFO coupled to data interfaces, a scrambler and CRC generator, a Reed-Solomon encoder, an interleaver, a data interface coupled to a constellation encoder, a data interface coupled to a constellation decoder, a deinterleaver, a Reed-Solomon decoder, descrambler and CRC check, an interface to external data sync, methods for control of configuration of data paths between hardware blocks, and methods for control and configuration of the individual hardware blocks in a manner that provides compliance with VDSL and many related standards.

20 Claims, 18 Drawing Sheets

Pipeline Schedule 1 clock per row

| RAM Read Access 1202 | Stage 1 Calculations 1204 | Stage 1 Storage 1206 | Stage 2 Calculations 1208 | Stage 2 Storage 1210 | Stage 3 Calculations 1212 | RAM Write Access 1214 |
|---|---|---|---|---|---|---|
| X0,X4 | a0,a4 | | | | | |
| X2,X6 | a2,a6 | a0,a4 | | | | |
| X3,X7 | a3,a7 | a0,a4, a2,a6 | b0,b2 | | | |
| X1,X5 | a1,a5 | a3,a4, a7,a6 | b4,b6 | b0,b2 | | |
| X0,X4 | a0,a4 | a3,a1, a7,a5 | b1,b3 | b0,b2,b4,b6 | | |
| X2,X6 | a2,a6 | a0,a4, a7,a5 | b5,b7 | b0,b2,b4,b6, b1,b3 | c0,c4 | |
| X3,X7 | a3,a7 | a0,a4, a2,a6 | b0,b2 | b0,b2,b4,b6 b1,b3,b7,b5 | c2,c6 | X0,X4 |
| X1,X5 | a1,a5 | a3,a4, a7,a6 | b4,b6 | b0,b2,b4,b6 b1,b3,b7,b5 | c3,c7 | X2,X6 |
| X0,X4 | a0,a4 | a3,a1, a7,a5 | b1,b3 | b0,b2,b4,b6 b4,b6,b7,b5 | c1,c5 | X3,X7 |
| X2,X6 | a2,a6 | a0,a4, a7,a5 | b5,b7 | b0,b2,b1,b3 b4,b6,b7,b5 | c0,c4 | X1,X5 |
| X3,X7 | a3,a7 | a0,a4, a2,a6 | b0,b2 | b0,b2,b1,b3 b4,b6,b7,b5 | c2,c6 | X0,X4 |
| X1,X5 | a1,a5 | a3,a4, a7,a6 | b4,b6 | b0,b2,b1,b3 b4,b6,b7,b5 | c3,c7 | X2,X6 |
| | | a3,a1, a7,a5 | b1,b3 | b0,b2,b4,b6 b4,b6,b7,b5 | c1,c5 | X3,X7 |
| | | | b5,b7 | b0,b2,b4,b6 b1,b3,b7,b5 | c0,c4 | X1,X5 |
| | | | | b0,b2,b4,b6 b1,b3,b7,b5 | c2,c6 | X0,X4 |
| | | | | | c3,c7 | X2,X6 |
| | | | | | c1,c5 | X3,X7 |
| | | | | | | X1,X5 |

MULTIPLE CHANNEL DIGITAL SUBSCRIBER LINE FRAMER/DEFRAMER SYSTEM AND METHOD

TECHNICAL FIELD OF THE DISCLOSURE

This disclosure pertains to the field of multicarrier transceivers, and, more particularly, to multicarrier transceivers capable of performing transforms appropriate for fast data rate communication systems.

BACKGROUND OF THE DISCLOSURE

There is a growing need among both individuals and enterprises for access to a commonly available, cost effective network that provides speedy, reliable service. There is high demand for a high-speed data network, one with enough bandwidth to enable complex two-way communications. Such an application is possible today if, for example, access is available to a university or a corporation with sufficient finances to build this type of network. But for the average home computer user or small business, access to high speed data networks is expensive or simply impossible. Telephone companies are therefore eager to deliver broadband services to meet this current explosion in demand.

One of the problems is that millions of personal computers have found their place in the home market. Today, personal computers can be found in over 60% of all United States households, many of which have more than one computer networked together, and over 50% of United States teenagers own computers. Virtually every computer sold today is equipped with a modem, enabling communication with the outside world via commercial data networks and the Internet. Currently, people use their personal computers to send and receive e-mail, to access online services, to participate in electronic commerce and to browse the Internet. The popularity of the Internet is such that there are over 100 million users around the globe. These figures indicate that in the past few years the personal computer has fueled a dramatic increase in data communications and the corresponding demands on the data networks that carry the traffic.

The Internet serves as a good example of the increased demands that have been placed on data networks. At first, Internet access consisted of text only data transfers. Recently, with the popularity of the World Wide Web (WWW) and the construction of numerous sites with high quality content, coupled with the development of Internet browsers such as Mosaic, Netscape Navigator and Microsoft Internet Explorer, the use of graphics, audio, video and text has surged on the Internet. While graphics, audio and video make for a much more interesting way to view information as opposed to plain text, bandwidth consumption is significantly higher. A simple background picture with accompanying text requires approximately 10 times the bandwidth needed by text alone. Real-time audio and streaming video typically need even more bandwidth. Because of the increased requirement for bandwidth, activities such as browsing home pages or downloading graphics, audio and video files can take a frustratingly long period of time. Considering that the multimedia rich World Wide Web accounts for more than one quarter of all Internet traffic, it is easy to see why the demand for bandwidth has outpaced the supply. In addition, the creative community is pushing the envelope by offering audio and full motion video on numerous sites to differentiate themselves from the millions of other sites competing for user hits.

As use of the Internet and online services continues to spread, so does the use of more complex applications, such as interactive video games, telecommuting, business to business communications and videoconferencing. These complex applications place severe strains on data networks because of the intensive bandwidth required to deliver data-rich transmissions. For example, a telecommuter who requires computer aided design (CAD) software to be transported over the data network requires a high-bandwidth data pipeline because of the significant size of CAD files. Similarly, a business to business transaction in which large database files containing thousand of customer records are exchanged also consumes large amounts of bandwidth. The same is true for users seeking entertainment value from sites offering high quality video and audio. The lack of available bandwidth in today's data networks is the primary barrier preventing many applications from entering mainstream use. Just as processing power limited the effectiveness of early PCs, bandwidth constraints currently limit the capabilities of today's modem user.

Most computer modem users access data through the standard telephone network, known as plain old telephone service (POTS). Equipped with today's speediest modems, dial up modems on a POTS network can access data at a rate of 28.8, 33.6 or 56 Kbps. Dial up modem transmission rates have increased significantly over the last few years, but POTS throughput is ultimately limited to 64 Kbps. While this rate may be acceptable for some limited applications like e-mail, it is a serious bottleneck for more complex transactions, such as telecommuting, videoconferencing or full-motion video viewing. To illustrate, full motion video compressed, using the Motion Picture Entertainment Group (MPEG)-2 standard requires a data stream of approximately 6 Mbps, or roughly 208 times the throughput of a 28.8 Kbps modem. Thus, using today's dial up modems, it would take more than 17 days to capture two hours of video. As bandwidth demands continue to grow, providers search for better ways to offer high speed data access. Further complicating the problem is the need to deliver all these complex services at an affordable price.

Today's most popular data access method is POTS. But as discussed previously, POTS is limited when it comes to large data transfers. An alternative to POTS currently available is Integrated Services Digital Network (ISDN). In the past few years, ISDN has gained momentum as a high-speed option to POTS. ISDN expands data throughput to 64 or 128 Kbps, both from the network to the home and from the home back to the network, and can be technically made available throughout much of the United States and in many other parts of the globe. Similar to POTS, ISDN is a dedicated service, meaning that the user has sole access to the line preventing other ISDN users from sharing the same bandwidth. ISDN is considered an affordable alternative, and in general, ISDN is a much better solution for applications such as Web browsing and basic telecommuting. However, like POTS, it severely limits applications such as telecommuting with CAD files and full-motion video viewing. The latter requires roughly 39 times the throughput than that provided by ISDN. Multichannel multipoint distribution service (MMDS), a terrestrial microwave wireless delivery system, and direct broadcast satellite (DBS), such as DirecTv and US Satellite Broadcasting (USSB), are wireless networks. They both deliver high bandwidth data steams to the home, referred to as downstream data, but neither has a return channel through which data is sent back over the network, referred to as upstream data. Although it is a relatively affordable system to deploy for broadcast applications, because it requires no cable wires to be laid, it falls short in interactive access. In order to use a wireless system for something as basic as e-mail, an alternate technology such as a telephone line must be used for the upstream communications.

Another network delivery system is asymmetric digital subscriber line (ADSL). Offering a downstream capacity of 6 Mbps or more to the home, ADSL has the downstream capacity to handle the most complex data transfers, such as full motion video, as well as an upstream capacity of at least 500 Kbps. However, due to its limitation of downstream bandwidth capacity, it essentially is a single service platform. Also, since it has to overcome the challenge of reusing several thousand feet of twisted pair wiring, the electronics required at each end of the cable are complex, and therefore currently very expensive.

Hybrid fiber coax (HFC), a network solution offered by telephone and cable companies, is yet another option for delivering high bandwidth to consumers known in the art. However, HFC has limitations. HFC networks provide a downstream capacity of approximately 30 Mbps, which can be shared by up to 500 users. Upstream bandwidth is approximately 5 Mbps and also is shared. A disadvantage with HFC is that shared bandwidth and limited upstream capacity become serious bottlenecks when hundreds of users are sending and receiving data on the network, with service increasingly impaired as each user tries to access the network.

It is a current trend among telephone companies around the world to include existing twisted pair copper loops in their next generation broadband access networks. Hybrid Fiber Coax (HFC), a shared access medium well suited to analog and digital broadcast, comes up short when utilized to carry voice telephony, interactive video and high speed data communications at the same time.

Fiber to the home (FTTH) is still prohibitively expensive in the marketplace that is soon to be driven by competition rather than costs. An alternative is a combination of fiber cables feeding neighborhood Optical Network Units (ONUs) and last leg premises connections by existing or new copper. This topology, which can be called fiber to the neighborhood (FTTN), encompasses fiber to the curb (FTTC) with short drops and fiber to the basement (FTTB), serving tall buildings with vertical drops.

One of the enabling technologies for FTTN is very high rate digital subscriber line (VDSL). The system transmits high-speed data over short reaches of twisted pair copper telephone lines, with a range of speeds depending upon actual line length.

The VDSL standard as provided by the ANSI T1E1.4 Technical Subcommittee, provides guidelines for the transmitter and receiver within the VDSL modem.

Unlike ADSL, very high bit rate DSL (VDSL) is capable of providing speeds of 52 Mbps downstream and 16 Mbps upstream. ADSL is capable of 10 Mbps downstream and 800 Kbps upstream. Other standards beyond ADSL and VDSL are being considered by standards bodies. For example, VDSL2 is one such standard. To implement these current and upcoming standards, a discrete multitone (DMT) transceiver is required that can operate at higher bit rates efficiently.

SUMMARY OF THE INVENTION

A VDSL standard compliant transceiver is the framer and deframer is disclosed. The framer, also referred to as the scrambler/Reed-Solomon encoder (SRS), is a part of the transmitter and accepts user and control data in the form of one or more logical channels, partitions this data into frames, adds error correction codes, randomizes the data through a scrambler, and multiplexes logical channels into a single data stream. The multiplexed data is then passed to the constellation encoder as the next step in the formation of the VDSL symbol. The deframer, also referred as the descrambler/Reed-Solomon decoder (DRS), is part of the receiver and performs the inverse function of the framer. Disclosed is a highly configurable hardware framer/deframer that includes a digital signal processor interface configured to provide high level control, a FIFO coupled to data interfaces, a scrambler and CRC generator, a Reed-Solomon encoder, an interleaver, a data interface coupled to a constellation encoder, a data interface coupled to a constellation decoder, a deinterleaver, a Reed-Solomon decoder, descrambler and CRC check, an interface to external data sync, methods for control of configuration of data paths between hardware blocks, and methods for control and configuration of the individual hardware blocks in a manner that provides compliance with VDSL and many related standards.

BRIEF DESCRIPTION OF THE DRAWINGS

For a more complete understanding of the present disclosure, and the advantages thereof, reference is now made to the following brief descriptions taken in conjunction with the accompanying drawings, in which like reference numerals indicate like features.

FIG. 12 is a table illustrating a plurality of banks for holding partial products during different stages of FFT and IFFT processing in accordance with an embodiment of the present invention.

DETAILED DESCRIPTION

Figure 1:
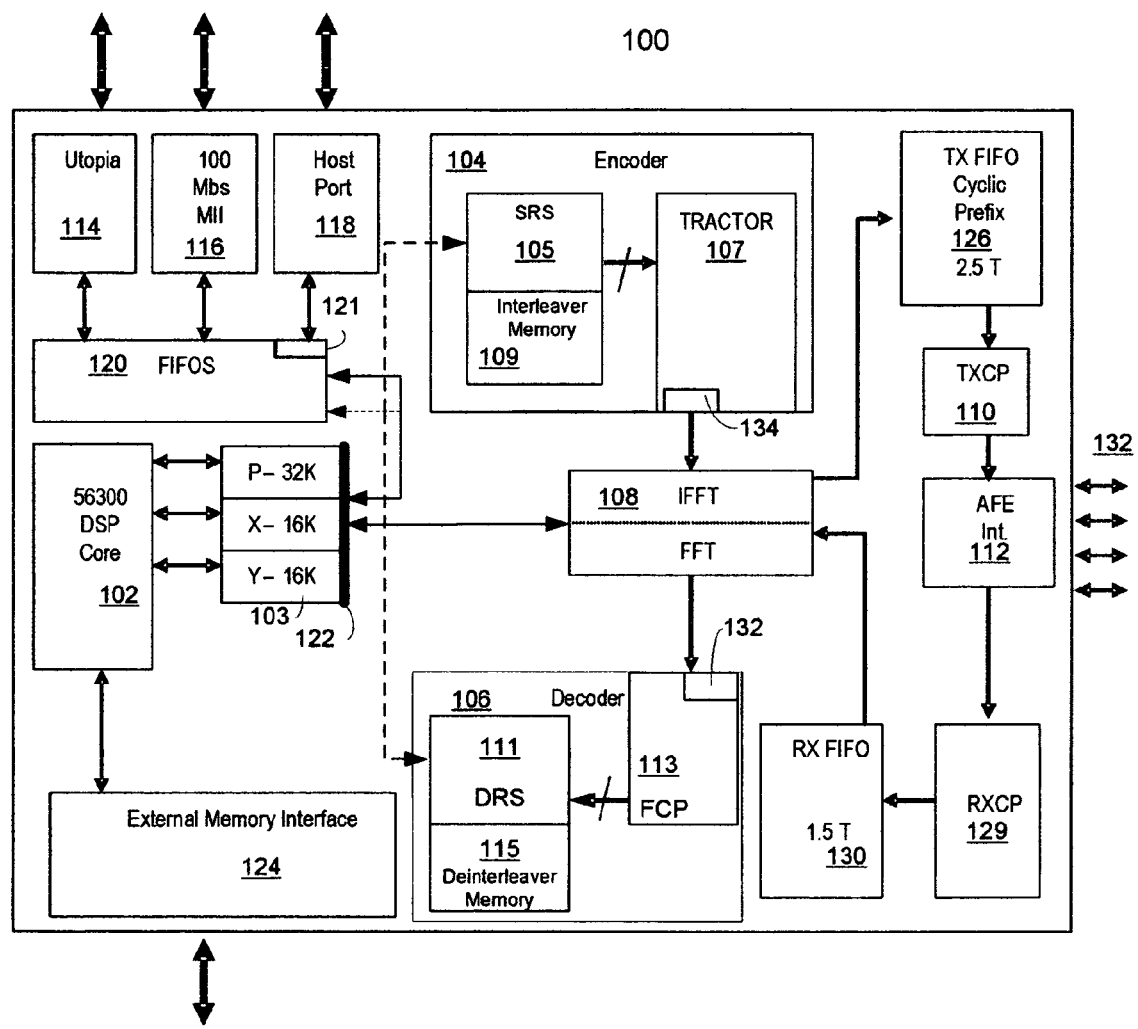
FIG. 1 is a block diagram of an application specific integrated circuit (ASIC) configured as a VDSL/ADSL communication engine in accordance with an embodiment of the present invention.

In order to facilitate an understanding of the present invention a glossary of terms used in the description of the present invention is provided below:

ADSL: Asynchronous Digital Subscriber Line
AFE: Analog Front End
AGU: Address Generation Unit
CRC: Cyclic Redundancy Code
DFT: Discrete Fourier Transform
DMA: Direct Memory Access
DMT: Discrete Multi Tone
DRS: De-interleaver/Reed-Solomon decoder and descrambler
DSP: Digital Signal Processor
FCP: FEQ Slicer
FEQ: Frequency Domain Equalizer
FIFO: First In/First Out Memory
FIR: Finite Impulse Response
FFT: Fast Fourier Transform
IFFT: Inverse Fast Fourier Transform
RXCP: Time Domain Receive Co-Processor
Showtime: Operations involving transfer of data
SRS: Framer/Scrambler/Reed-Solomon Encoder
TEQ: Time Domain Equalizer
TRACTOR: Trellis and Constellation Encoder/Bit and Tone Ordering component.
TXCP: Time Domain Transmit Co-Processor.
VDSL: Very high bit-rate Digital Subscriber Line
VOC: VDSL overhead control channel The multicarrier engine 100 shown in FIG. 1 illustrates an area and power efficient architecture for multicarrier communication. Engine 100 includes a single DSP core 102 that interacts with multiple hardware coprocessor blocks to enable core 102 to perform higher level functions and control and allow the multiple hardware blocks to perform DMT calculations and data movement.

Engine 100 includes a DSP core 102 that can be implemented with a core compatible with a Motorola 56300 DSP with an X, Y, and P memory space 103. In an embodiment, all of the memory required for VDSL or four channel ADSL operations are provided within engine 100. In other embodiments, external memory can be added to engine 100 to support advanced features.

Engine 100 includes hardware co-processors, including encoder 104, decoder 106, FFT/IFFT coprocessor 108, TXCP coprocessor 110, RXCP 129 and an AFE interface control processor 112. Co-processors 104, 106, 108, 110, 112 and 129 perform all DMT operations from framing to cyclic extension and are configured to handle current and future DSL configurations independent of significant attention from core 102.

Engine 100 interfaces with a computer or network via one of three ports, 114, 116 and 118, shown as Utopia 114, 100 Mbs MII 116 and host port 118. Each of ports 114, 116 and 118 interface with FIFOs 120 and 121. FIFOs 120 and 121 are coupled to encoder 104 and DMA 122. FIFO 120 can be implemented as a shared FIFO between ports 114 and 116 because only one of the ports 114 and 116 is active at a time. FIFO 121 can be implemented as a dedicated host port FIFO and can operate with ports 114 and 116 or alone. Ports 114 and 116 can also be configured to share logic and the like. DMA 122 and core 102 can also interact with an external memory interface 124 to support adding external memory to engine 100 for advanced features. The local memory installed within each hardware block 104, 106, 110 and 112 and DMA 122 is coupled via point-to-point buses to IFFT/FFT 108 to send and receive data. Encoder 104 is coupled to receive data from FIFOs 120 and provide encoded data to IFFT/FFT co-processor 108. Encoder 104 is configured to include a framer/scrambler/Reed-Solomon encoder component (SRS) 105, which is coupled to a trellis and constellation encoder/bit extracting/tone ordering (TRACTOR) 107. SRS 105 is also coupled to interleaver memory 109. Additional encoder 104 components are further shown and described below with reference to FIG. 3.

IFFT/FFT 108 is coupled for transmitting cyclic extensions to FIFO 126, and to transmit time domain co-processor TXCP 110 and AFE 112. AFE 112 operates to both receive and transmit via interface 132. For the receive path, AFE 112 receives data via interface 132, provides the data to TEQ/RXCP 128/129, which passes the data to receive FIFO 130 and through to IFFT/FFT 108. IFFT/FFT 108 runs either an inverse or forward transform, depending on whether engine 100 is transmitting or receiving.

According to an embodiment, IFFT/FFT 108 can be used as the central timer for engine 100. Alternatively, the IFFT/FFT 108 in combination with RXCP 129 can operate to provide timing for engine 100. RXCP 129 can implement both an auto mode and a manual mode, each mode limited by the amount of time required to run transforms in IFFT/FFT 108. IFFT/FFT 108 has the most critical timing issues in the system and is configured to use FFT processing time markers to setup hardware blocks for a next symbol. More specifically, IFFT/FFT 108 uses approximately one half of a symbol period to process a FFT or IFFT. The end of FFT processing marks the beginning of the next sample period. At this time, according to one embodiment, an option is to allow all hardware blocks to be idle except for the continuous time domain blocks (FIFOs 120, TXCP 110, and AFE interface 112). Core 102 could use this time marker to setup hardware blocks for the next symbol. IFFT/FFT 108 provides start symbols to encoder 104 and decoder 106.

In alternate embodiments, hardware blocks can be configured to run as directed by either an auto mode or a manual trigger and generate an interrupt on completion. Thus, for example, core 102 can operate to receive an interrupt identifying a hardware block as having completed a function and generate a request for another hardware block. A hardware block can also run via an auto-mode request received by another hardware block over a point-to-point bus, for example. Each hardware block can perform different functions according to the trigger or request received. The frequency domain components, such as IFFT/FFT 109 and FCP 113 perform according to received requests. In the embodiment, frequency domain components can be configured to perform operations during about 90% of a symbol period.

Decoder 106 receives a signal to begin processing as soon as the FFT output has been written to a decoder 106 input FIFO 132. Conversely, RX FIFO 130 triggers encoder 104 when a programmable threshold mark is reached in FIFO 134. Then, encoder 104 triggers IFFT/FFT 108 when data is available. Optionally, engine 100 controls timing directly and hardware timing signals are ignored in such a case. In either case, however, encoder 104 and decoder 106 each have almost a full symbol period in which to perform their calculations. Decoder 106 is shown including de-interleaver/Reed-Solomon decoder and descrambler (DRS) 111, which receives data from FEQ slicer/FCP 113. Like encoder 104, DRS 111 is coupled to de-interleaver memory 115.

Figure 2:
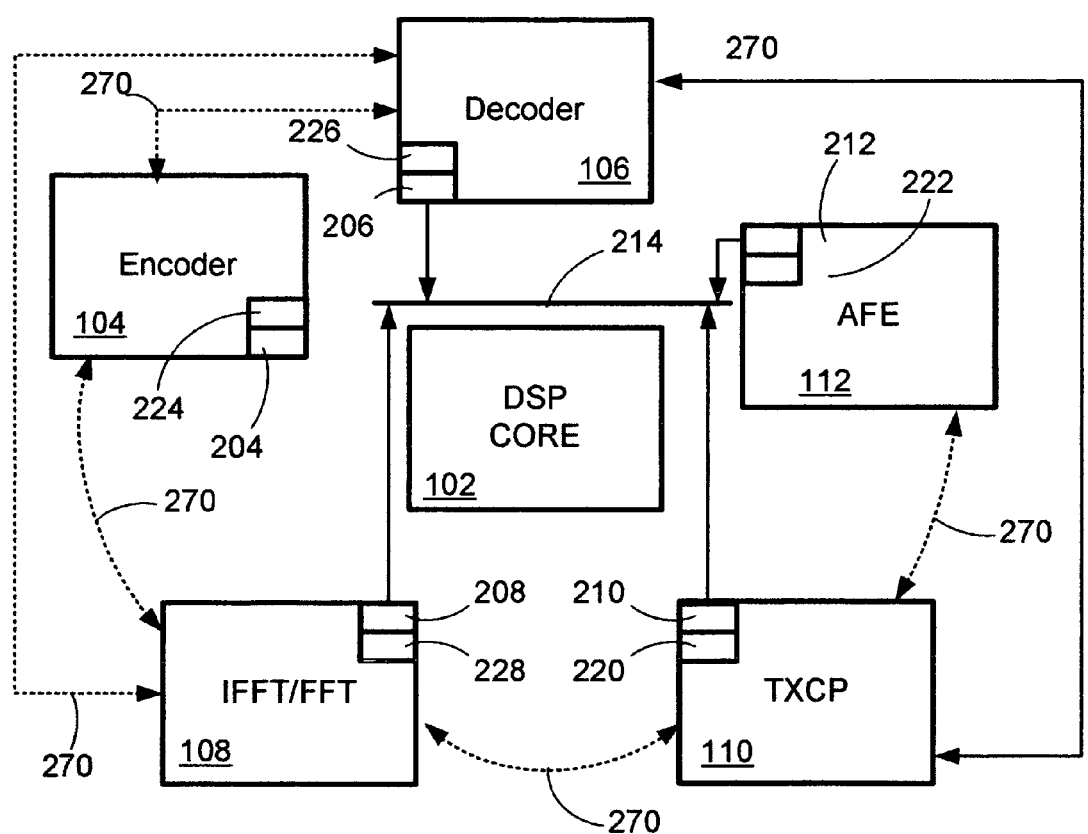
FIG. 2 is an enhanced block diagram of portions the ASIC shown in FIG. 1 in accordance with an embodiment of the present invention.

Referring to FIG. 2, co-processors 104, 106, 108, 110 and 112 each include a set of registers 204, 206, 208, 210 and 212 mapped in the X or Y peripheral address space for core 102. A peripheral bus interface 214 is used for transferring control information between core 102 and co-processors 104, 106, 108, 110 and 112. Local memories 224, 226, 228, 230, 232 and 234 within each co-processor are also indirectly mapped into a peripheral address space via a memory port, which can be implemented as a set of registers including address and data registers and a state machine. Specifically, in an embodiment, data is written to the address and data registers of the memory port. Core 102 writes to the address register first, the other side of the address register is coupled to the address bus of a memory. Core 102 can then write to the data register and the data is written to the memory associated with the register. In one embodiment, the mapping gives core 102 the ability to setup DMA transfers of data to and from distributed memories in co-processors 104, 106, 108, 110 and 112. In one embodiment, the address register has an auto-update mode. More specifically, a number of modes can be provided for auto-update, such as increment, increment by two, decrement, decrement by two, and decrement or increment per specific block. As will be appreciated by those of skill in the art with the benefit of this disclosure, an auto-mode can implement one or several of the increment and decrement modes according to system requirements.

Due to the high bandwidth requirements at various stages of the transmitter and receiver, core 102 is not used for data movement. Rather, each hardware block 104, 106, 108, 110 and 112 transfers data to the next under DSP control. In an embodiment, each transfer can be configured to be self-managing, controlled by core 102 initialized parameters. In the embodiment, hardware flags synchronize timing between processes.

As shown in FIG. 2, data transfers can occur on dedicated point-to-point buses 270, shown between each hardware block 104, 106, 108, 110 and 112 and each next logical block in a path. Because buses 270 are point-to-point, they are much simpler than those used for the bi-directional peripheral and DMA buses. Point-to-point buses 270 are designed to efficiently support the dataflow requirements for data transmit and receive (hereinafter referred to as "Showtime") operation. In one embodiment, point-to-point buses 270 are configurable to enable the different requirements during training of engine 100. Each hardware block can perform a pass-through from input to output on point-to-point buses 270 allowing the point-to-point buses to form a ring structure.

Point-to-point buses 270 can include five sets of signals: target channel, data bus, transfer request, transfer active, and a target ready. Each hardware module 104, 106, 108, 110 and 112 in the transmit and receive paths has a point-to-point connection to the next logical module in the path. A simple handshake is used to transfer data on the buses. When a module is ready to transfer data on the bus it puts the target address on the address bus, the data on the data bus, and asserts the transfer request. The next module in the chain indicates that it is ready to accept data on the bus by asserting the ready signal. A data transfer occurs on every cycle in which the transfer request and ready signals are asserted. The transfer active signal is used to frame a block transfer of data. Either the transmitter or receiver can throttle the block transfer using the handshake signals. Importantly, according to an embodiment, the handshake procedure is completed independent of round trip timing between receiver and transmitter. Thus, most of a clock cycle becomes available for transfer of data and control signals between hardware blocks. The timing is therefore localized thereby reducing routing issues for deep submicron implementation.

The hardware co-processor blocks can be triggered to begin performing calculations by core 102 or by a signal from another hardware block.

Transmit Path Operation

Figure 3:
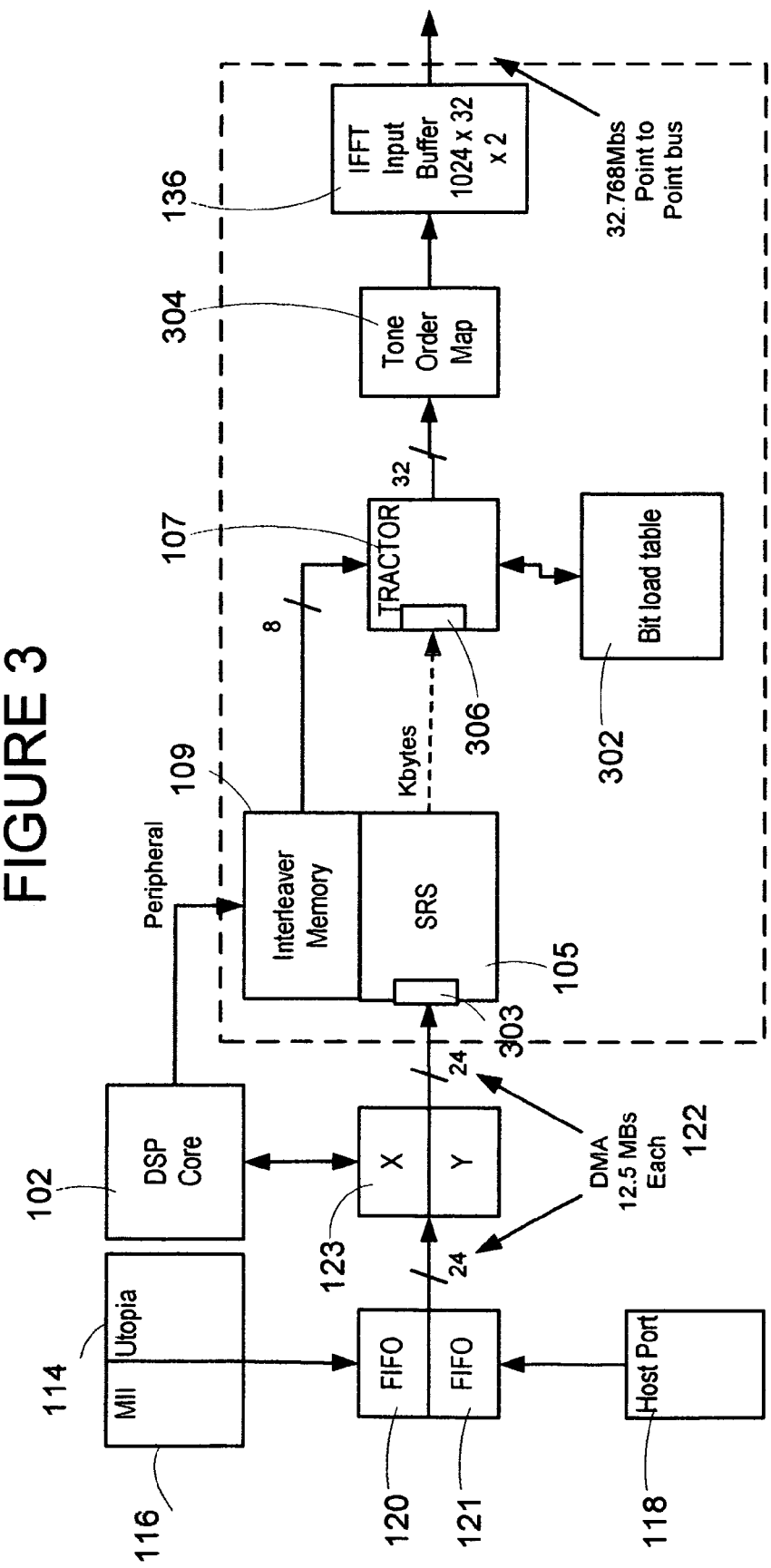
FIG. 3 is a block diagram illustrating a transmit path in accordance with an embodiment of the present invention.

Referring now to FIG. 3 in combination with FIG. 1, transmit path operation is now described. The data to be transmitted to a remote modem arrives on the Utopia 114, MII 116, or host Port 118 interfaces and is deposited into either FIFO 120 or 121. Because Utopia 114 and Ethernet interfaces such as MII 116 do not generally require simultaneous operation, a single input FIFO 120 is shared by both interfaces 114 and 116. Host port 118 does not share a FIFO with these interfaces because it can possibly be required to enable communication between two engine 100s during Showtime. Thus, an embodiment provides that host port 118 has a separate smaller FIFO 121. DMA controller 122 transfers FIFO data to X or Y data memory 123 for use by core 102 or directly to encoder 104. In one embodiment, Utopia 114 and 100 Mbs MII 116 share large FIFOs, such as 4K bytes per channel for 16K bytes total bytes. Host port 118 can be configured to interface with a small 24 byte FIFO 121. FIFO 121 can be used to shield block data from DMA latency and provide higher DMA performance. In one embodiment, FIFO 121 is configured to perform data conversions, including bit swapping, byte swapping, byte packing and the like.

The transfers of FIFO data and the subsequent processing only occur during Showtime operation. In an embodiment, the maximum data rate in the transmit direction is 120 Mbs. After core 102 receives data in memory, the data is available for processing or can be sent to encoder 104 via DMA 122. In one embodiment, core 102 memory is used to provide additional flexibility and buffering. Since the data can also be DMA transferred directly to encoder 104 from a FIFO 120, 121, an embodiment provides for enabling sufficient space in the relevant FIFO to hold one sample period of input data. When multiple channels are employed, FIFO space can be divided evenly among the channels.

In FIG. 3, encoder 104 is shown configured to perform framing, CRC generation, scrambling, interleaving, which are performed in SRS 105, as well as bit extraction, constellation encoding, and tone ordering in TRACTOR 107. Encoder 104 is shown in FIG. 3 as including SRS 105, a 32 Kbyte interleave buffer 109, TRACTOR 107, which is coupled to both interleave buffer 109 and SRS 105. TRACTOR 107 is shown coupled to bit load table 302 and to tone order map 304. Tone order map 304 is coupled to IFFT input buffer 134.

Encoder 104 functions are divided between SRS 105 and TRACTOR 107 modules. In an embodiment, encoder 104 is configured independent of fixed logic that would be required for these operations. Instead, SRS 105 and TRACTOR 107 are designed to be reasonably generic and programmable by core 102. Thus, encoder 104 can be altered for future specification changes. Further, hardware components therein can be reused for training and other non-Showtime functions.

Regarding the functionality within encoder 104, SRS 105 fetches data from core 102 memory or directly from FIFO 120 via DMA 122 and performs framing, CRC generation, scrambling, and Reed-Solomon encoding. Next, SRS transmits the data in the interleave memory. These functions can be performed serially, thus, SRS 105 has minimal local storage requirements. Four small input FIFOs are used to buffer the incoming DMA transfers. The four FIFOs are provided to support the four basic types of input data: fast mode payload, fast mode overhead, interleaved mode payload, and interleaved mode overhead. In one embodiment, FIFO 121 can be configured to be located within encoder 104 rather than as a separate entity. Thus, depending on system requirements, FIFO 121 can be configured to be duplicated or replaced with a FIFO 121 in SRS 105, DRS 111, Host Port 118, and/or coupled to MII 116 interface and Utopia 114 interface.

SRS 105 issues a DMA request when one of the input FIFOs reaches a low water mark. When SRS 105 is ready to process a new frame of data, core 102 configures the block with all framing parameters, DMA parameters, and other controls and then starts the SRS 105. From that point, SRS 105 operates independent of core 102 and fetches data from memory as needed. SRS 105 processes approximately one byte per system clock cycle. Thus, the only significant latency produced by SRS 105 is the latency produced by the interleaver function.

SRS 105 manages interleave memory 109 completely. More specifically, SRS 105 writes and reads samples using interleave memory 109 and provides them through a small FIFO to TRACTOR 107. Interleave memory 109 is designed as a byte wide memory to simplify access for complex interleaver addressing modes. In the worst case, the bandwidth into and out of the buffer is a total of 25 MBs. Since core 102 has higher memory requirements for Training than Showtime and the interleaver is not active during Training, the 32 KB of interleave memory 109 is available for use by core 102. Memory 109 can be accessed through the memory port of the SRS. Memory 109 appears as an 8K×32 memory block to core 102.

TRACTOR 107 receives interleaved and non-interleaved data from SRS 105 and performs bit extraction, rotation, constellation encoding (with or without trellis), and tone ordering. TRACTOR 107 also includes circuitry for generating training symbols such as O/R-P-TRAINING, O/R-P-SYNCHRO, and O/R-P-MEDLEY as provided in the VDSL and ADSL specifications, as is known. In one embodiment, TRACTOR 107 includes a pseudo-random number generator and constellation rotator to assist in generating training symbols.

Processing in TRACTOR 107 occurs in bit order by first performing bit extraction and rotation and then performing constellation encoding. TRACTOR 107 performs tone ordering by writing to different locations in output memory. IFFT/FFT 108 sequentially receives data from TRACTOR 107 output memory. Thus, IFFT portion of IFFT/FFT 108 receives tone ordered data.

SRS 105 sends bytes to TRACTOR 107. These bytes are received in TRACTOR input buffer 306. TRACTOR input buffer 306 receives bytes and organizes the data into 16 or 32 bit words. TRACTOR input buffer 306 also serves to maintain data flow by preventing the different timing requirements of TRACTOR 107 and SRS 105 from causing excessive stalls.

In one embodiment, TRACTOR 107 processes low bit count constellations from the TRACTOR input buffer 306 before processing high bit count constellations from interleave memory 109. Core 102 writes to bit load table 302 in tone order. The tables can be rearranged by core 102 in tone or bit order to enable a simplified or tone order configuration. TRACTOR input buffer 306 data passes to the constellation encoder. Depending on the path input to TRACTOR input buffer 306, the processing of TRACTOR input buffer 306 will be dominated by the speed of the constellation encoder. Initially, the data with the fewest bits is sent first and TRACTOR 107 extracts multiple constellations from a byte of data. As constellation sizes grow, the SRS 105 operations adjust accordingly. For one path, when the higher bit loaded constellations of interleave memory 109 are processed, the processing time will be dominated by SRS speed. For the worst cases, TRACTOR input buffer 306 stalls will not dominate the processing because of the larger constellation size. In all cases, the delay through SRS 105 and TRACTOR 107 will be much less than a symbol period.

In multi-channel ADSL mode, SRS 105 and TRACTOR 107 functions must be shared between up to four channels. Each of SRS 105 and TRACTOR 107 completes an entire symbol of processing for one channel before moving to the next. In one embodiment, memory and other resources available for supporting VDSL are enough to support four ADSL channels with the exception of interleave memory 109. ADSL channels can use more than the available 32 Kbytes of memory requiring external memory or core 102 memory to be used for the interleave function. After constellation encoding, TRACTOR 107 performs tone re-ordering and deposits the constellation points into TRACTOR output buffer 134.

IFFT Functionality for Transmit

Figure 4:
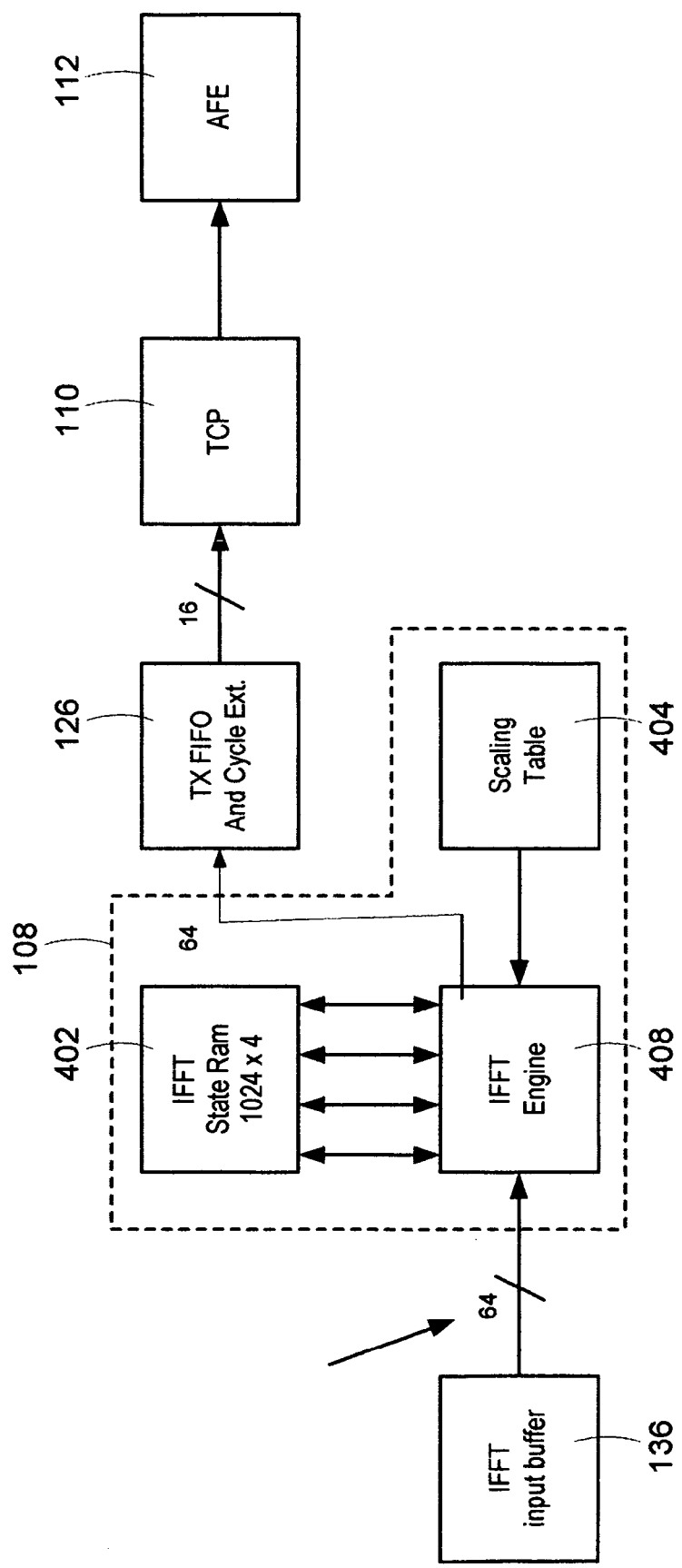
FIG. 4 is a block diagram illustrating IFFT/FFT functionality interactions for a signal transmit path in accordance with an embodiment of the present invention.

Referring now to FIG. 4, a block diagram illustrates IFFT/FFT 108 functionality interactions for the transmit path. Specifically, TRACTOR output buffer 134 is coupled to transmit up to 1024 pairs of complex tones in 64 bits to IFFT engine 108 at a rate of about 64 bits per system clock to IFFT/FFT engine 108. From IFFT/FFT engine 108, data is transferred to and from FFT state ram 402. Scaling table 404 is shown to store values such that each bin can be multiplied in the frequency domain, such that power is best allocated among the bins.

IFFT/FFT 108 operates on 4096 tones and copies data via point-to-point transfers from TRACTOR output buffer 134 into the correct transmit locations in internal memory based on a transmit and receive frequency map associated with the point-to-point transfers. IFFT/FFT 108 performs pre-scaling on the transmit tones during this transfer. In one embodiment, zeroing is accomplished by clearing all memory before an input transfer; writing to each of four banks at once; and clearing a state RAM in a number of clock cycles. The number of clock cycles can be 1024 or as system requirements dictate.

The output of IFFT/FFT 108 is transferred to transmit FIFO 126 at a bursting rate of about four 16-bit samples per clock. A 64 bit dedicated bus is used to limit the amount of FFT 108 processing time that is consumed by the transfer. Transmit FIFO 126 can be implemented as a single port RAM and the AFE interface 112 can require access to it once for every four AFE clocks. For the case where the system clock is four times the AFE clock the AFE interface will require a FIFO access once every $16^{th}$ system clock. In such a system, an IFFT output transfer can be configured to use 2176 clocks. The AFE 112 side of FIFO 126 requires a new sample every 16 system clocks because four samples are read from the FIFO per system clock and the system clock frequency can be implemented to be, for example, four times the sample clock. In other embodiments the engine 100 can be configured to be independent of an AFE 112 sample clock.

In the case of multiple ADSL channels, FIFO 126 is logically partitioned into multiple FIFOs with individual input/output pointers. The multiple FIFOs allow FFT coprocessor

108 to fill FIFO 126 in the same manner as VDSL. The AFE 112 side of FIFO 126 can read the data out from alternate channels on each system clock and send the data to the appropriate off chip AFE 112. More specifically, AFE 112 can be configured to include a small, such as a four sample size FIFO on each channel. When an AFE 112 clock occurs for a channel, the channel can be considered as making a request for data. When a sample is requested from receive FIFO 130, that channel can be considered as having a request serviced. The channel with the highest number of outstanding requests is the next to request data from FIFO 130.

Transmit FIFO 126 contains hardware for performing cyclic extension calculations. The cyclic extension parameters (CE, CS, CP, and Beta) are fully configurable by core 102. According to an embodiment, 2048 transfers occur for 8192 samples. IFFT/FFT 108 bursts an additional prefix extension making the size of the transfer depend on the cyclic extension size. Any size that is a multiple of four that is less than the transform size can be supported by an output transfer. For example, if the cyclic prefix and postfix extensions are 256 samples, then IFFT/FFT 108 starts the output transfer 256 samples before the end of the symbol. IFFT/FFT 108 transfers the last 256 samples, for example, four per clock, then transfers the entire symbol by wrapping back to address zero in FFT state memory. Finally, IFFT/FFT 108 transfers the 256 sample at the beginning of the symbol by wrapping to zero again. The wrapping to zero is accomplished by defining a starting logical sample address and a modulo value for the output transfer. The actual memory addresses can be calculated by applying digit reversal and then an appropriate algorithm, such as the FAST algorithm, which one of skill in the art will appreciate.

IFFT/FFT 108 can also assist the cyclic extension by transferring the data at the beginning of the symbol twice. In one embodiment, the two transfers include once at the beginning and once at the end. The Beta window as provided in the VDSL specification requires a table to store the window function. A FIFO can provide a separate register file for this purpose. Separate copies of the cyclic prefix parameters can be maintained for each ADSL channel in the register file since they are read out of the FIFO in a round robin fashion.

Core 102 is configured to be able to adjust the input and output pointers of FIFO 126 to perform symbol synchronization and timing advance. The TX FIFO 126 is sized at least 2.5 times the sample size to support the adjustment.

AFE 112 interfaces engine 100 to a VDSL AFE or up to four ADSL AFEs. AFE 112 can be designed to be flexible enough to support existing and future AFEs and support the data interfaces of multiple ADSL AFEs simultaneously. In addition to the data buses, a dedicated serial interface can be provided for use in controlling the AFEs. Thus, in one embodiment, AFE interface 112 can be configured to be flexible enough to support many devices.

In one embodiment, a programmable FIR engine is included for the transmit path at the front end of AFE interface 112, shown as transmit time domain Co-Processor (TXCP) 110. In another embodiment, TXCP 110 includes an FIR engine, a one to 32× interpolation stage, and a second FIR engine. In this embodiment, the additional components can be configured to support different specifications such as ADSL/2/2+ and to provide better digital filtering for VDSL.

Receive Path Operation

Figure 5:
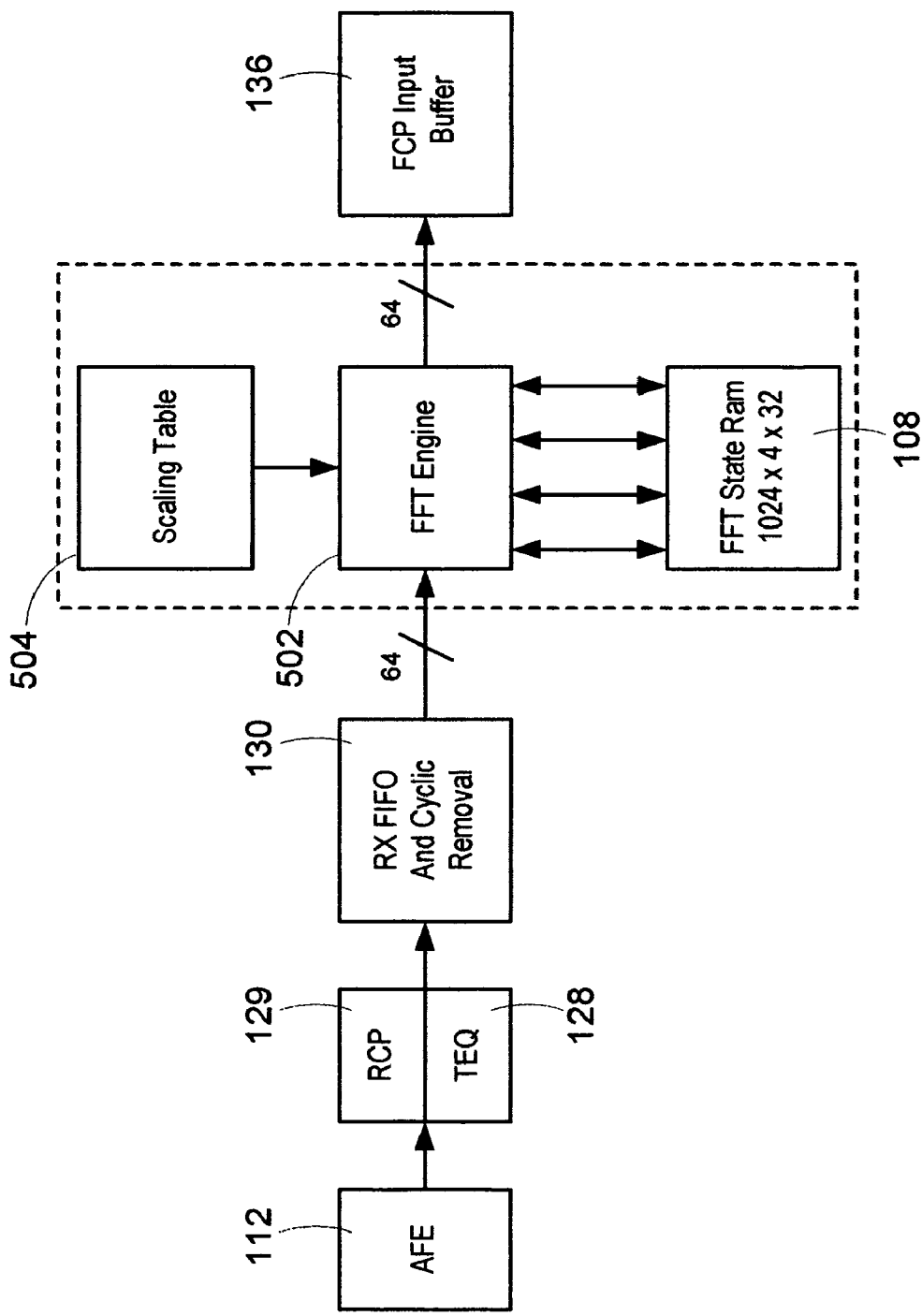
FIG. 5 is a block diagram illustrating IFFT/FFT functionality interactions for a signal receive path in accordance with an embodiment of the present invention.

Referring now to FIG. 5 in combination with FIG. 1, the receive path is shown in a block diagram. Like the transmit path, the receive path receives one 16-bit sample per sample clock, for example, from AFE 112 in VDSL mode. Received VDSL data is filtered by a TEQ filter in RXCP 129 before being stored in receive FIFO 130. TEQ filter in RXCP 129 can be a 16 tap FIR that is calculated by RXCP (Receive Time Domain Co-Processor) 129. RXCP 129 requires four multipliers to be able to calculate one TEQ output per 35.328 MHz clock. In VDSL Showtime operation RXCP 129 performs TEQ calculations in a serial fashion and writes its data to the receive FIFO 130. However, for multi-channel ADSL modes RXCP 129 must perform calculations for up to four channels. Since ADSL sample rates are much lower, RXCP 129 requires no additional processing capabilities. However, RXCP 129 needs additional memory for the TEQ filter delay lines and coefficients.

In an embodiment, RXCP 129 can be configured to include a decimator, and FIR engine, a second decimator, and a second FIR engine to perform time domain equalization.

Like transmit FIFO 126, receive FIFO 130 is implemented as a single port 64 bit wide ram. Receive FIFO 130 is configured with read and write pointers that are controllable by core 102 for use in symbol alignment. FIFO 130 can also be programmed to discard the cyclic extension and can be logically partitioned into four FIFOs for multi-channel mode. After symbol synchronization is achieved, receive FIFO 130 can generate a symbol rate timing signal by comparing the number of input samples received to a core 102 defined threshold. The symbol rate timing signal defines the symbol boundary that can be used to trigger the FFT operation. For a normal symbol, core 102 is configured to adjust the FIFO pointers to effectively discard any cyclic extension (prefix and postfix). In engine 100, symbol synchronization occurs once during training. During training, a timing change occurs between the receiver components and the transmit components. IFFT/FFT 108 has a fixed processing time, thus to line up timing components and allow IFFT/FFT 108 and other components to complete operations, symbol times are extended. Transmit FIFO 126 is configured to contain enough data to continue to supply AFE 112 during such an extension, up to one symbol.

FFT For Receive Functionality

Referring to FIG. 1 in combination with FIG. 5, when IFFT/FFT 108 is available for performing an FFT, a symbol of data (8192×16) is burst transferred into IFFT/FFT 108 on a dedicated 64 bit bus. Similar to the transmit path, single-ported receive FIFO 130 causes the burst to lose cycles while TXCP 110 is writing the FIFO 130. The cyclic extension data is discarded by the FIFO logic and not transferred to FFT engine 502 within IFFT/FFT 108. FFT engine 502 needs about 12000 cycles (including TX FIFO 126 input transfer) to perform the FFT and another 1024 to write the results to FCP 113. FFT engine 502 takes advantage of the idle butterfly hardware to perform output scaling using scaling table 504 during the output transfer. Only the active receive tones are transferred, based on a TX/RX frequency map, which can be implemented as a set of registers in the IFFT/FFT 108. The system clock can be run independent of the AFE sample clock in one embodiment, or can be run as dependent on the AFE sample clock, according to system requirements which can be appreciated by one of skill in the art. The time can be used for DMA access to the FFT state memory or scaling tables. The time may not be enough to DMA transfer the complete state memory of the FFT block if FFT/IFFT processing must continue at the symbol rate. However, the active bins can be DMA transferred out of the FCP 113, instead or the state memory can be transferred using a core 102 memory copy. Core 102 controlled memory can copy one word per clock while DMA transfers require two clocks per word.

Figure 6:
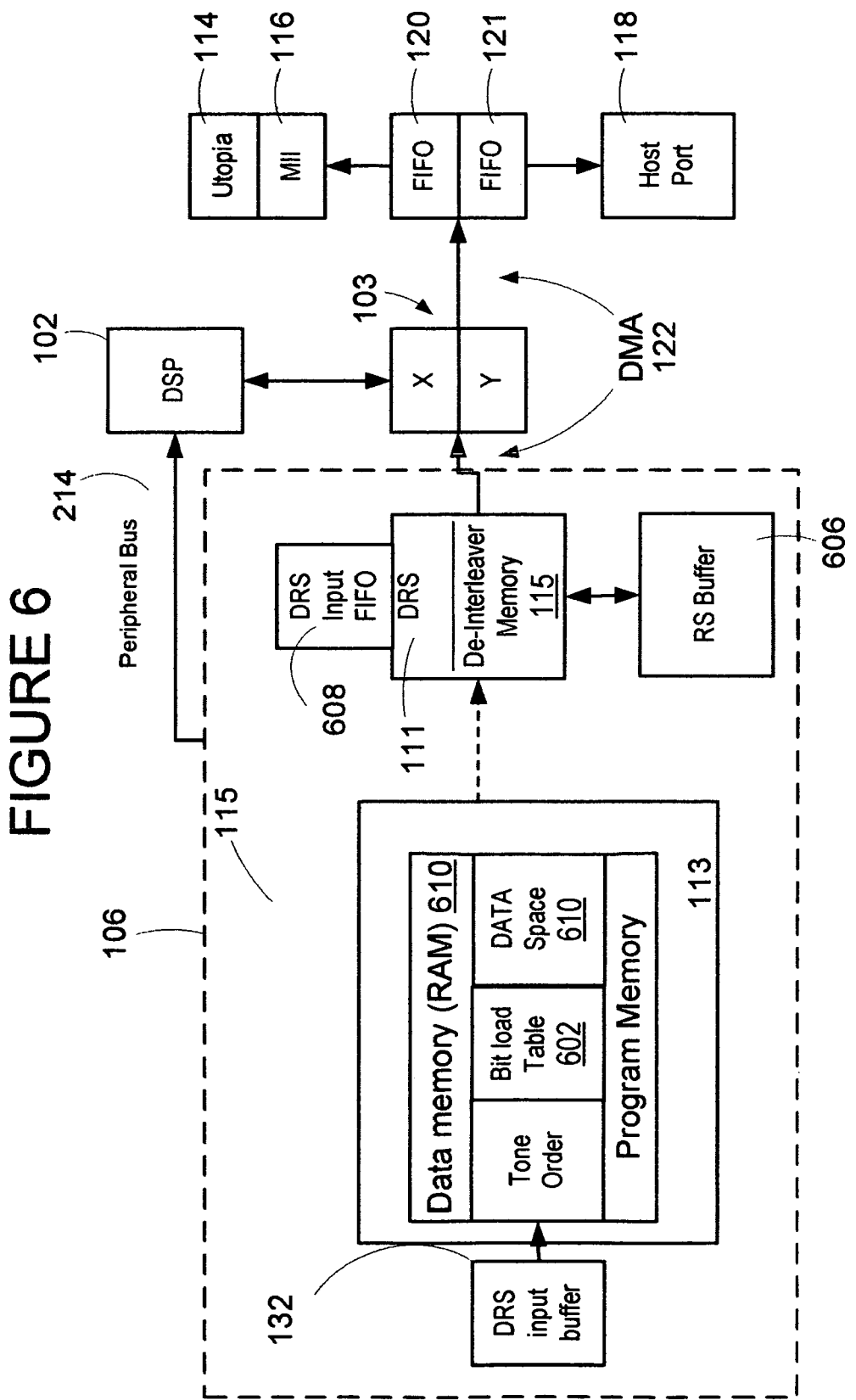
FIG. 6 is a block diagram illustrating decoder functionality in accordance with an embodiment of the present invention.

Referring now to FIG. 6, receive paths through decoder 106 are illustrated. FFT output transfers are transmitted to decoder 106 FCP buffer 134 via point-to-point bus 270. FFT output transfers have the highest priority for access to the FCP buffer 134. Therefore, the FFT transfer will not be stalled by other FCP operations. FCP 113 is triggered to begin processing by core 102 or by the completion of the FFT transfer. FCP 113 performs the FEQ filtering (including filter training), slicing, Viterbi decoding, SNR calculations, and framing. To save processing time and hardware requirements the FCP 113 only operates on the active bins for the receive direction. FCP 113 performs reverse tone ordering as it reads the data out from buffer 134. Therefore, the complex points are fetched from the buffer in the order they need to be reassembled to form a de-interleaver bit stream. FCP 113 is coupled to de-interleaver memory 115, to pass data to DRS 111. To facilitate training symbol recovery, in one embodiment, FCP 113 also has a pseudo-random number generator and tone rotator.

FCP 113 can be implemented as a specialized complex data processor that is capable of performing all FEQ, SNR, and slicing operations. FCP 113 can contain its own program space that is written by core 102. Since FCP 113 works on one frequency bin at a time, it normally discards partial results and does not require a lot of temporary storage RAM. However, it can be programmed to load partial results, such as FEQ calculations, and the like, into the FCP input buffer 132 for access by core 102. FCP 113 is coupled to bit load table 602 that can include signal to noise ratio memory and coefficient memory.

To guarantee that decoder 106 completes in one sample period FCP 113 is configured to complete its operations in about 75% of a sample period. For VDSL, that equates to 13 clocks per frequency bin in the worst case. Other decoder functions can occur in parallel with FCP 113 operations once enough data is available to start the pipelines.

When FCP 113 has re-assembled the bit stream it writes the data into a DRS input FIFO 608 via a point-to-point transfer. DRS input FIFO 608 is needed, in part, because the FCP 113 output is bursty while DRS 111 operation is pipelined. The front end of DRS 111 pipeline can be configured as a de-interleaver. De-interleave memory 115 is available for use by core 102 during training in the same fashion as SRS 105 interleave memory. DRS 111 can also perform Reed-Solomon decoding, CRC checking, and de-scrambling. The de-interleave function is performed by the addressing logic as data is fetched for Reed-Solomon decoding. Unlike the Reed-Solomon encoder, decoder 106 needs to have access to a full code word of data in case it needs to make corrections. Therefore, the Reed-Solomon decoder has a local 256 byte buffer 606 to hold the maximum sized Reed-Solomon code word. Reed-Solomon decoder in DRS 111 can be configured to wait for an entire codeword from input FIFO 608 to be available in the de-interleaver before starting the decode because a symbol of data does not necessarily contain an integer number of code words. Otherwise, temporary storage would be required to save the state in multi-channel mode.

In one embodiment, DRS input buffer 608 is treated like a FIFO with programmable watermarks. The watermarks can be used to trigger the FCFS circuitry for the DRS and select the next channel for processing. The watermarks can be configured to trigger when a codeword is available and is set to indicate a size, for example, for a full codeword for each channel.

After any corrections are made the data is de-scrambled. Cyclic redundancy check (CRC) checks are performed at superframe boundaries and for the VDSL overhead control channel (VOC) and other the fast bytes are extracted and stored in FIFOs for core 102 accesses. DRS 111 further includes de-framing logic with the same degree of programmability as the framer in SRS 105. The final output of the block is DMA transferred to core 102 memory or directly to the interface FIFO. When data is sent to core 102 memory, another DMA transfer will be required to move it to the interface FIFOS.

Peripheral Memory Map

Figure 2A:
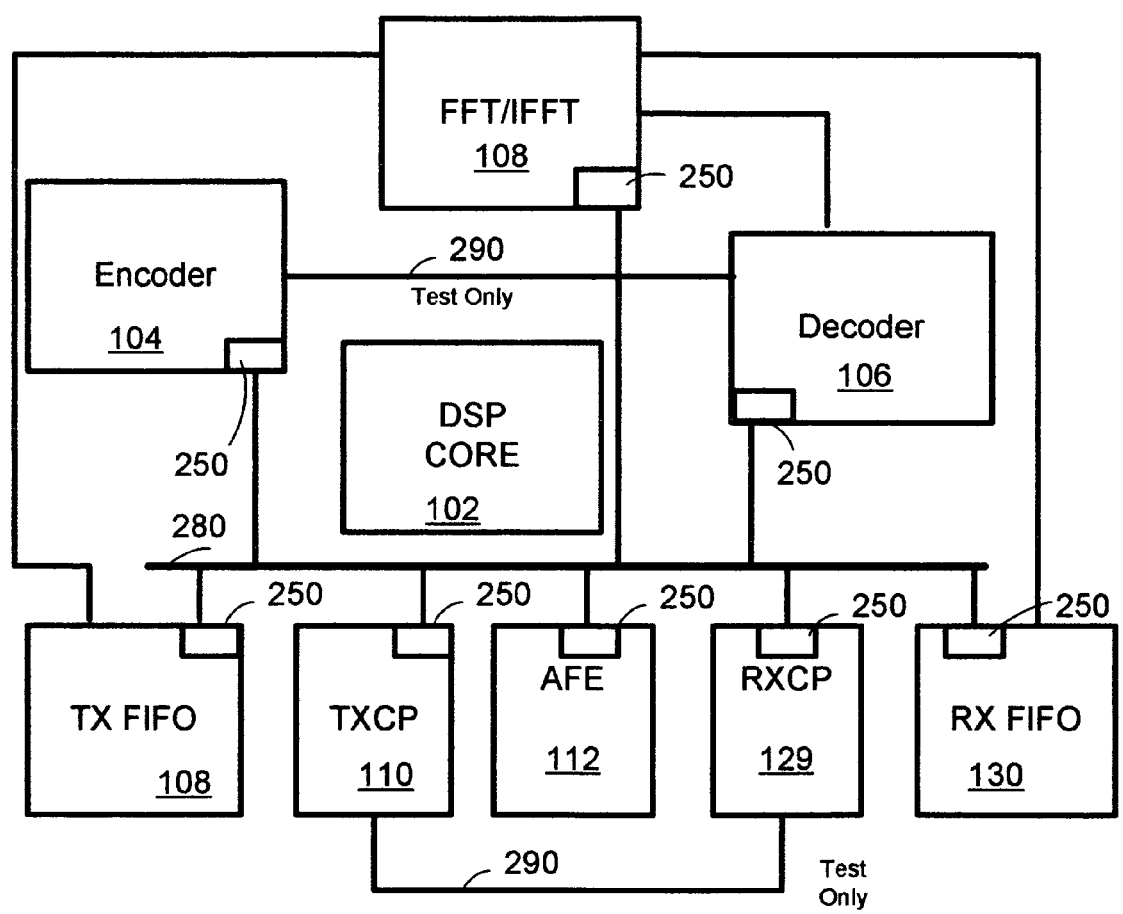
FIG. 2A is a block diagram of portions of the ASIC shown in FIG. 1 illustrating a peripheral bus and peripheral memory configuration in accordance with an embodiment of the present invention.

Referring now to FIG. 2A, engine 100 uses distributed processing and much of the memory is distributed as well. As shown, each peripheral processor module, including FFT/IFFT 108, encoder 104, decoder 106, TX FIFO 108, TXCP 110, AFE 112, RXCP 129 and RX FIFO 130, can be configured to include local RAM and/or ROM. If all of these memories were mapped directly into engine 102 X/Y data space the clock rate of the device would be limited by the speed of those data buses. Also, if local memories are 32 bits wide, such a configuration makes it difficult to directly map them into the 24 bit data buses. To avoid these issues, local memories are configured to be indirectly mapped using a memory port 250 located in each peripheral module. Memory ports 250 provide core 102 access to all memories on engine 100. More particularly, as shown, each of the memory ports 250 are coupled to bus 280. The ports 250 can be designed to provide full speed access to the memories for block data transfers. Also shown in FIG. 2A, are direct connections 290 for purposes of testing. Direct connections 290 are shown between encoder 104 and decoder 106; and shown between RXCP 110 and RXCP 129.

Each memory port 250 can be configured to include an X or Y peripheral I/O mapped address and data registers and an associated state machine. An address register can be used to specify the address for access within a local memory as well as an optional auto-increment or auto-decrement function. A data register can be used by core 102 as the data interface for all reads and writes to the local memory. When the Address register is written by core 102, the state machine issues a read to the local memory and stores the memory output in a Data register. Core 102 can then read that memory location by reading the Data register. If the Address register is setup for auto-increment or auto-decrement then each core 102 read to the Data register will update the Address register and cause another local memory read. Since the data is always pre-fetched in anticipation of a read, the Data register can be read on every core 102 cycle after the Address register is setup. The operation is the same for writes except that the core 102 can issue a write to the Data register. Therefore, block transfers to peripheral memories via ports 250 can occur at the full speed of core 102 data buses. However, each random access to the memories requires a write to an Address register, then a cycle for pre-fetch, and finally an access to the Data register. Therefore, the random access bandwidth of the peripheral memories is about ⅓ of the core 102 data bus speed.

In an embodiment, peripheral memories are 32 bits wide and the memory port state machine maps 32 bit data into 24 bit core 102 buses. Two core 102 bus transactions can be used to transfer each 32 bit word. Accesses to even addresses affect the 16 MSBs of the 32 bit word and odd addresses affect the 16 LSBs. The 16 bit quantities are packed into the MSBs of the 24 bit word and the 8 LSBs are padded with 0s. Since two core 102 writes are required to update each memory location, the local memory write cycle will only occur after the second (odd) location is written.

The following table lists all of the distributed memories in engine 100 and shows how they are mapped into each peripheral's memory port 250 address space. As shown, the memories are addressed as 16 bit quantities and the Start and End addresses are the values that would be written to the Address register for that module.

TABLE 1

| Module | Memory | Size | Start Address | End Address |
|---|---|---|---|---|
| FFT | State RAM 0 | 1K × 32 | 0000 | 07ff |
| | State RAM 1 | 1K × 32 | 0800 | 0fff |
| | State RAM 2 | 1K × 32 | 1000 | 17ff |
| | State RAM 3 | 1K × 32 | 1800 | 1fff |
| | FFT Post-Scale RAM | 1K × 32 | 2000 | 27ff |
| | IFFT Pre-Scale RAM | 1K × 32 | 2800 | 2fff |
| | Twiddle ROM 0 | 512 × 32 | 3000 | 33ff |
| | Twiddle ROM 1 | 512 × 32 | 3400 | 37ff |
| SRS | Interleaver RAM | 8K × 32 | 0000 | 3fff |
| DRS | De-Interleaver RAM | 8K × 32 | 0000 | 3fff |
| | Input FIFO | 1K × 32 | 4000 | 47ff |
| TRACTOR | State RAM 0 & 1 1536 × 32 RAMS interleaved addr. | 3072 × 32 | 0000 | 17ff |
| FCP | State RAM 0 & 1 5120 × 32 RAMS interleaved addr. | 10240 × 32 | 0000 | 4fff |
| | Reserved | 6144 × 32 | 5000 | 7fff |
| | Program RAM | 512 × 32 | 8000 | 83ff |
| FIFO | RX FIFO RAM 0 & 1 3584 × 32 RAMs interleaved addr. | 7168 × 32 | 0000 | 37ff |
| | FIFO Coefficient RAM | 64 × 32 | 4000 | 407f |
| | Reserved | 8160 × 32 | 4040 | 7fff |
| | TX FIFO RAM 0 & 1 6144 × 32 RAMs interleaved addr. | 12288 × 32 | 8000 | dfff |
| MUT | TX FIFO | 4K × 32 | 0000 | 1fff |
| | RX FIFO | 4K × 32 | 2000 | 3fff |

System Timing in Showtime

Figure 7:
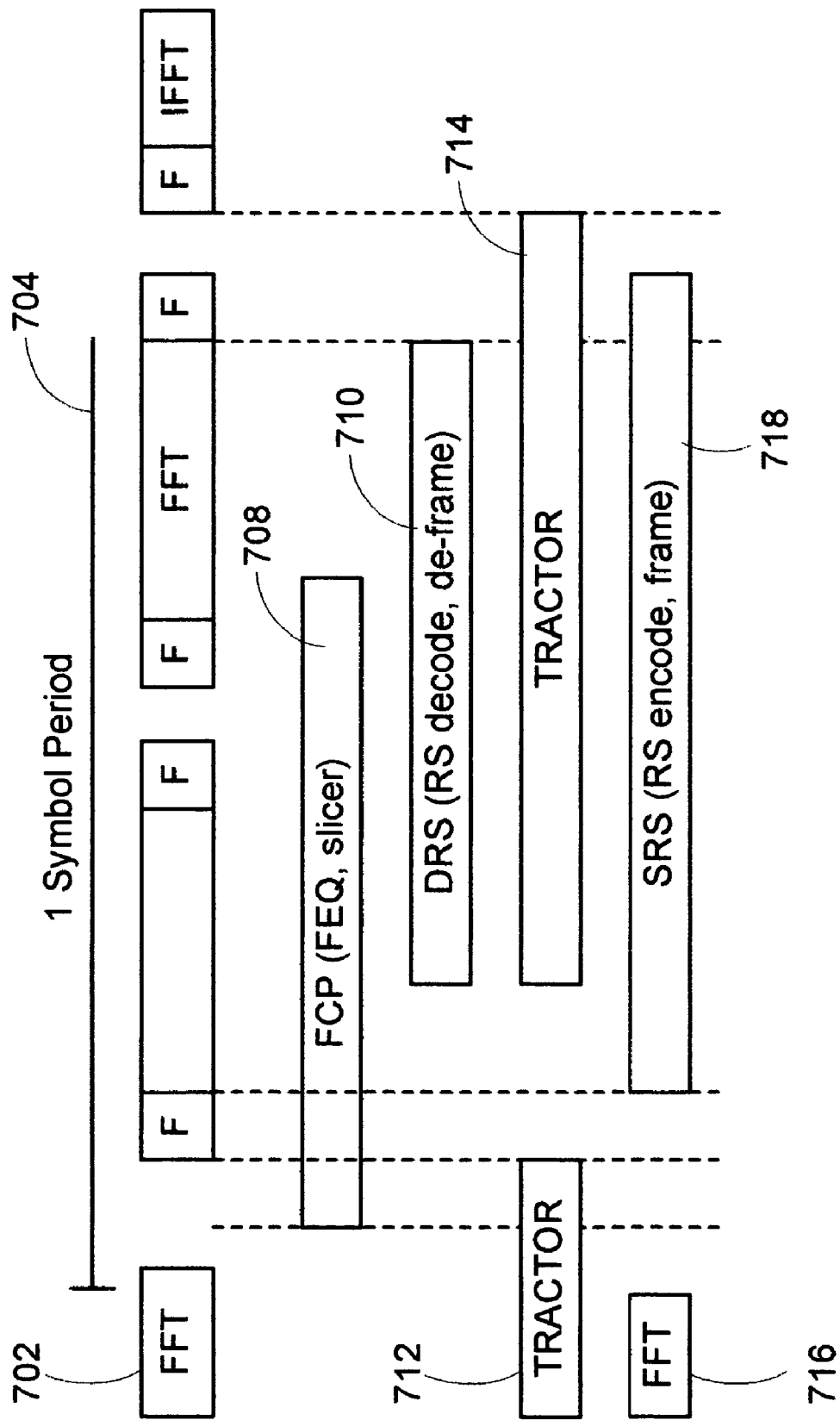
FIG. 7 is a timing diagram illustrating Showtime operation in accordance with an embodiment of the present invention.

Referring now to FIG. 7, a timing diagram illustrates that in VDSL or ADSL Showtime operations, the system is synchronized to a symbol timing signal of approximately 4 kHz. In the case of a customer premise equipment (CPE) modem, the symbol timing signal is extracted from the received symbols. For the central office (CO), the timing signal may be produced by dividing down a sample clock or by sampling an external timing reference.

In an embodiment, engine 100 provides that the system is timed around an event that is synchronous but out of phase with this signal by using the FFT completion interrupt. FFT completion is viewed as the start of symbol for system control purposes. This event was chosen because it is somewhat fixed in time due to the limited resources for performing FFTs and IFFTs.

Referring now to FIG. 7, timing diagrams illustrate the system timing for VDSL. For four-channel ADSL mode the diagram is similar but runs at four times the symbol rate. FIG. 7 illustrates the end of FFT processing 702, which also marks a start of a symbol period 704. F blocks 706 represent times during which the FFT coprocessor is transferring data to and from FIFOs. During these times, the coprocessors that write and read the FIFOs must be idle. This requirement allows the FIFOs to use single-ported RAMS. Encoder 104 and decoder 106 each have a symbol period or FIFO time in which to process a frame of data. To keep hardware buffering to a minimum, SRS 716 and TRACTOR 712 operate on the same data frame, as shown. Since the TRACTOR requires data from the SRS it can only process when data is available. Therefore, there is a delay shown as the difference between RS encode frame 718 and CE encoding startup 714 to prevent possible pipeline stalls when data is not available. A similar situation exists for the FCP and DRS, as shown by the difference between FCP 708 and DRS 710.

In one embodiment, RX FIFO 130 includes a programmable watermark that sets a watermark that can enable a programmable skew between the watermark and beginning of operations of encoder 104. When a watermark is set, the timing reference becomes the watermark and replaces the FFT completion timing reference. When RX FIFO contains a full symbol, operations can begin.

FFT Functionality

Figure 8:
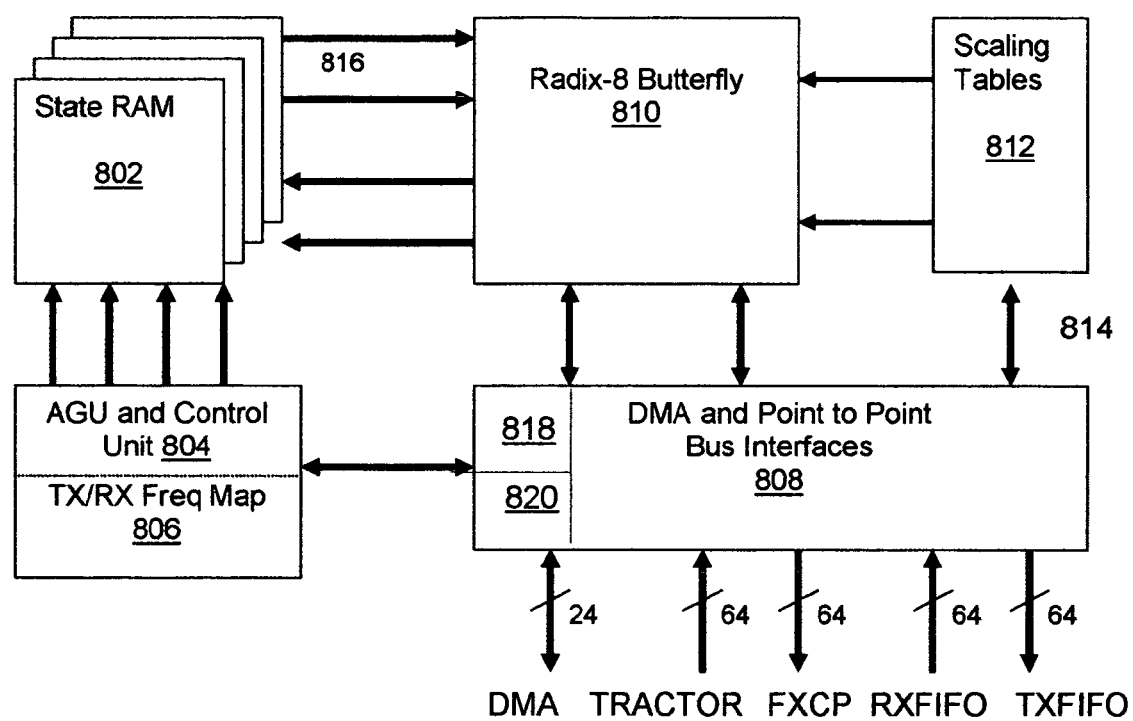
FIG. 8 is a block diagram illustrating an IFFT/FFT architecture in accordance with an embodiment of the present invention.

Referring now to FIG. 8 in combination with FIG. 1, an embodiment is directed to systems and methods associated with IFFT/FFT 108. In general, IFFT/FFT co-processor 108 calculates FFT and IFFT transforms for a DMT data pump. FIG. 8 provides a block diagram of components within IFFT/FFT 108, including a state RAM 802 coupled to receive generated addresses for FFT calculations from address generation unit (AGU) 804. AGU 804 is further responsible for transfers between state memory and external modules locations addresses and generates addresses for the state RAM 802 based on transmit and frequency map 806. Blocks 804 and 806 are coupled to DMA and point-to-point bus interfaces 808. DMA and point-to-point bus interfaces 808 are coupled to radix-8 butterfly 810 and to scaling tables 812.

IFFT/FFT 108 performs FFT, IFFT, IFFT pre-scaling, FFT post-scaling, and frequency mapping and format conversion. Some operations occur during data transfers, including frequency mapping (IFFT in, FFT out), IFFT pre-scaling, FFT post-scaling, IFFT post-scaling with one scale value per symbol, and number format conversion (fixed to floating point for input, and floating point to fixed for output).

In an embodiment, IFFT/FFT 108 is in use for approximately 30000 clock cycles during a sample period. To achieve this speed, IFFT/FFT 108 can incorporate a programmable radix-8 hardware butterfly 810, shown in detail in FIG. 9.

As shown in FIG. 8, state RAM 802 can be configured to hold four banks of 1024 complex samples, each complex sample being 32 bits in length, which can be organized with 16 bit-wide real and imaginary parts therein. State RAM 802 receives addresses and control signals from AGU 804, the addresses of which determine the data fed to the radix-8 butterfly 810. Transmit and receive frequency map 806 stores which FFT outputs are used for transmit and which FFT outputs are used for receive operations. Both AGU 804 and transmit and receive frequency map 806 interact with DMA and point-to-point bus interfaces 808 to receive instruction from core 102. Additionally, the amount of data transferred over interfaces 808 is tracked for control purposes.

Butterfly 810 can be configured to calculate one complex radix-8 butterfly per 4 clocks. State RAM 802 and butterfly 810 have four buses there between. Two of the four buses 816 transmit two complex samples to butterfly 810. Two of the four buses 816 transmit complex samples to state RAM 802. Butterfly 810 transmits and receives samples to and from DMA and point-to-point bus interfaces 808. More specifically, data received by interfaces 808 is scaled in butterfly 810 prior to transfer to and from state RAM 802.

Butterfly 810 further interacts with scaling tables 812, which can be configured with 2048 16 bit wide locations for holding scaling factors for use during FFT processing, and 2048 16 bit wide locations for holding scaling factors for use during IFFT processing. The scaling factors can be used to multiply each data point before or after IFFT and FFT processing. Scaling tables 812 are coupled to DMA and point-to-point bus interfaces 808 allowing the scaling factors to be written by core 102.

DMA and point-to-point bus interfaces 808 provide a method to write and retrieve data and control information to butterfly 810, scaling tables 812 and AGU 804 from other components in engine 100, such as core 102, TRACTOR 107, FCP 113, RX FIFO 130 and TX FIFO 126. To control butterfly 810 and scaling tables 812, an embodiment provides for a control bus 814. DMA and point-to-point bus interfaces 808 enable the DMA and point-to-point buses to both supply data. In one embodiment, a peripheral bus provides primary control and the point-to-point bus provides an "active" signal to also provide some control. IFFT/FFT 108 listens for an active signal to determine when there is data available from the source (RXF or TRACTOR). IFFT/FFT 108 can be programmed to start running when that signal goes active. In one embodiment point-to-point input "active" signals could occur at the same time or in different orders. To better support an Automatic mode, IFFT/FFT 108 can be programmed to take the first available or to always toggle between running an FFT and an IFFT.

Butterfly 810 and state RAM 802 implement an in-place FFT algorithm and floating point calculations to reduce memory requirements, thereby overwriting prior calculations stored in state RAM 802. Beneficially, an in-place FFT algorithm and floating point usage limits internal state memory, state RAM 802, to 4096 complex samples of 32 bits each. The 4096 complex samples are separated into four banks of 1024 samples each to provide the memory bandwidth required by butterfly 810. During FFT calculations, the butterfly hardware reads two complex samples and writes two complex samples per clock as shown by buses 816.

According to an embodiment, during input and output data transfers all samples are passed through the butterfly logic before being written to state RAM 802. Requiring all samples to pass through the butterfly logic prior to being written to state RAM 802 allows the butterfly to efficiently apply scaling coefficients as the data is read from or written to state RAM 802.

To provide sufficient data to the butterfly on every clock cycle, a complex memory organization and addressing scheme can be employed. AGU 804 is responsible for generating the addresses for FFT calculations and for transfers between state memory and external modules. During FFT processing, AGU 804 generates two read and two write addresses per clock cycle. The read and write addresses are applied to four state memory banks 802. During external module data transfers, AGU 804 can translate incoming/outgoing sample index into a state bank and RAM address. All state memory transfers except DMA involve pairs of samples. Thus, AGU 804 can perform two translations per clock.

IFFT/FFT 108 is used by both transmit and receive data paths and can have dedicated point-to-point buses 808 for both paths. For the transmit path, IFFT/FFT 108 receives data that was encoded in TRACTOR 107 via output FIFO 134 and sends data to transmit FIFO 126. For the receive path, IFFT/FFT 108 receives data from the RX FIFO 130 and writes it to the FCP 113 at input FIFO 132. Point-to-point buses 270 can be sized at 64 bits so that they can carry two complex samples and four real samples per clock. The bandwidth avoids having IFFT/FFT 108 spend excessive time doing data transfers and avoids requiring dual port RAMs in the input and output FIFOs 132 and 134.

According to an embodiment, the central location of IFFT/FFT 108 is used to enable the buses 270 and DMA 122 useful for data routing requirements other than the normal Showtime data flow. Therefore, the bus interfaces 808 of IFFT/FFT 108 are capable of performing a loop back from TRACTOR 107 to the FCP interface 113. More specifically, as shown in interfaces 808, TRACTOR 107 and FCP 113 can be directly coupled through interface 808 for testing frequency domain components in isolation outside of Showtime.

The IFFT/FFT 108 interfaces 808 includes a DMA interface that can be used to transfer data to/from any internal memory on engine 100. In one embodiment, DMA bus is logically connected to all memories. Therefore, a transfer can occur between the FFT and X/Y/P RAM, or the FFT and the RAM in another peripheral block. In an embodiment, IFFT/FFT 108 can be configured to be idle during state data transfers if internal memories are not dual ported.

Core 102 access to the FFT coprocessor 108 can be accomplished using program controlled I/O or DMA. In either case, the module appears as a set of registers to core 102. Rather than memory mapping the FFT coprocessor's local memory in core 102, an embodiment provides memory access port 818 via DMA and peripheral bus interfaces. More specifically, the peripheral bus interface is used when core 102 accesses a memory mapped register using a peripheral input/output interface. To core 102, memory access port 818 appears as a set of memory mapped registers. The access port simplifies the integration of IFFT/FFT 108 into engine 100 without significant reduction in memory bandwidth for burst transfers.

In one embodiment, bus interface 808 includes peripheral input/output registers 820 that are used by IFFT/FFT 108 as part of the standard interface capable of interfacing with one or more of co-processors 104, 106, 108, 110, 112 and 129. The interface can be implemented as a programmer's interface that shares qualities for each coprocessor. Input/output registers 820 can include a control register to hold general controls such as reset and interrupt enables; a status register can contain interrupt and other status information. The Memory Port registers 818 can be used to provide core 102 access to the IFFT/FFT 102 internal memories.

In one embodiment, IFFT/FFT 108 includes an auto-increment and other like addressing modes to facilitate DMA block transfers through memory access port 818. The configuration register holds module specific configuration information such as the FFT size and radix.

In an embodiment, IFFT/FFT 108 is configured to hold five memory instances mapped into the address space of memory port 818, which can be four 1K×32 and one 2K×32. Logically, the four 1K×32 memories can be configured as state memory mapped into the memory port address space as one sequential 8K×16 memory. Similarly, the 2K×32 scale factor memory can be mapped into a sequential 4K×16 address range. IFFT/FFT 108 can also be configured with two 512×32 ROMs mapped into memory port 818 address space for testing purposes. Memory port 818 address map can vary depending on the number of channels that IFFT/FFT 108 is configured to process as shown in the following tables.

TABLE 2

Memory Port Address Map - 1 channel

| Name | Size | Start Address | End Address |
| --- | --- | --- | --- |
| State Ram 0 | 2K × 16 | 0000 | 07ff |
| State Ram 1 | 2K × 16 | 0800 | 0fff |
| State Ram 2 | 2K × 16 | 1000 | 17ff |
| State Ram 3 | 2K × 16 | 1800 | 1fff |
| FFT Post-Scale Ram | 2K × 16 | 2000 | 27ff |
| IFFT Pre-Scale Ram | 2K × 16 | 2800 | 2fff |
| Twiddle ROM 0 | 1K × 16 | 3000 | 33ff |
| Twiddle ROM 1 | 1K × 16 | 3400 | 37ff |

TABLE 3

FFT Memory Port Address Map - 2 channel

| Name | Size | Start Address | End Address |
|---|---|---|---|
| State Ram 0 | 2K × 16 | 0000 | 07ff |
| State Ram 1 | 2K × 16 | 0800 | 0fff |
| State Ram 2 | 2K × 16 | 1000 | 17ff |
| State Ram 3 | 2K × 16 | 1800 | 1fff |
| FFT Post-Scale Ram - Channel 0 | 1K × 16 | 2000 | 23ff |
| FFT Post-Scale Ram - Channel 1 | 1K × 16 | 2400 | 27ff |
| IFFT Pre-Scale Ram - Channel 0 | 1K × 16 | 2800 | 2bff |
| IFFT Pre-Scale Ram - Channel 1 | 1K × 16 | 2c00 | 2fff |
| Twiddle ROM 0 | 1K × 16 | 3000 | 33ff |
| Twiddle ROM 1 | 1K × 16 | 3400 | 37ff |

TABLE 4

FFT Memory Port Address Map - 4 channel

| Name | Size | Start Address | End Address |
|---|---|---|---|
| State Ram 0 | 2K × 16 | 0000 | 07ff |
| State Ram 1 | 2K × 16 | 0800 | 0fff |
| State Ram 2 | 2K × 16 | 1000 | 17ff |
| State Ram 3 | 2K × 16 | 1800 | 1fff |
| FFT Post-Scale Ram - Channel 0 | 512 × 16 | 2000 | 21ff |
| FFT Post-Scale Ram - Channel 1 | 512 × 16 | 2200 | 23ff |
| FFT Post-Scale Ram - Channel 2 | 512 × 16 | 2400 | 25ff |
| FFT Post-Scale Ram - Channel 3 | 512 × 16 | 2600 | 27ff |
| IFFT Pre-Scale Ram - Channel 0 | 512 × 16 | 2800 | 29ff |
| IFFT Pre-Scale Ram - Channel 1 | 512 × 16 | 2a00 | 2bff |
| IFFT Pre-Scale Ram - Channel 2 | 512 × 16 | 2c00 | 2dff |
| IFFT Pre-Scale Ram - Channel 3 | 512 × 16 | 2e00 | 2fff |
| Twiddle ROM 0 | 1K × 16 | 3000 | 33ff |
| Twiddle ROM 1 | 1K × 16 | 3400 | 37ff |

In an embodiment, IFFT/FFT 108 is equipped with a low-power gated clock mode, which can be implemented with either an AND gate or an OR gate, for example coupled to a clock. Setting the soft reset bit of the control register will prevent any clocked circuits downstream from the clock gating logic from receiving transitions on the clock. Thus, all logic can be reset and will use minimal power due to the removal of the clock.

During Showtime operation, in one embodiment IFFT/FFT 108 can perform 4000 FFT and 4000 IFFT transforms per second. Rather than performing an 8192 point real to complex FFT, the architecture for IFFT/FFT 108 can provide for splitting the input into a real portion and an imaginary portion and perform a 4096 point complex FFT to reduce the number of operations required by approximately one half. The reduction is accomplished by performing 4096 point complex transforms and then post-processing the results to produce the required 8192 points. Thus, the required local storage is also reduced by one half. For IFFT processing, the input is also split into a real portion and an imaginary portion, resulting in a reduction in approximately of have of the number of operations.

Figure 9:
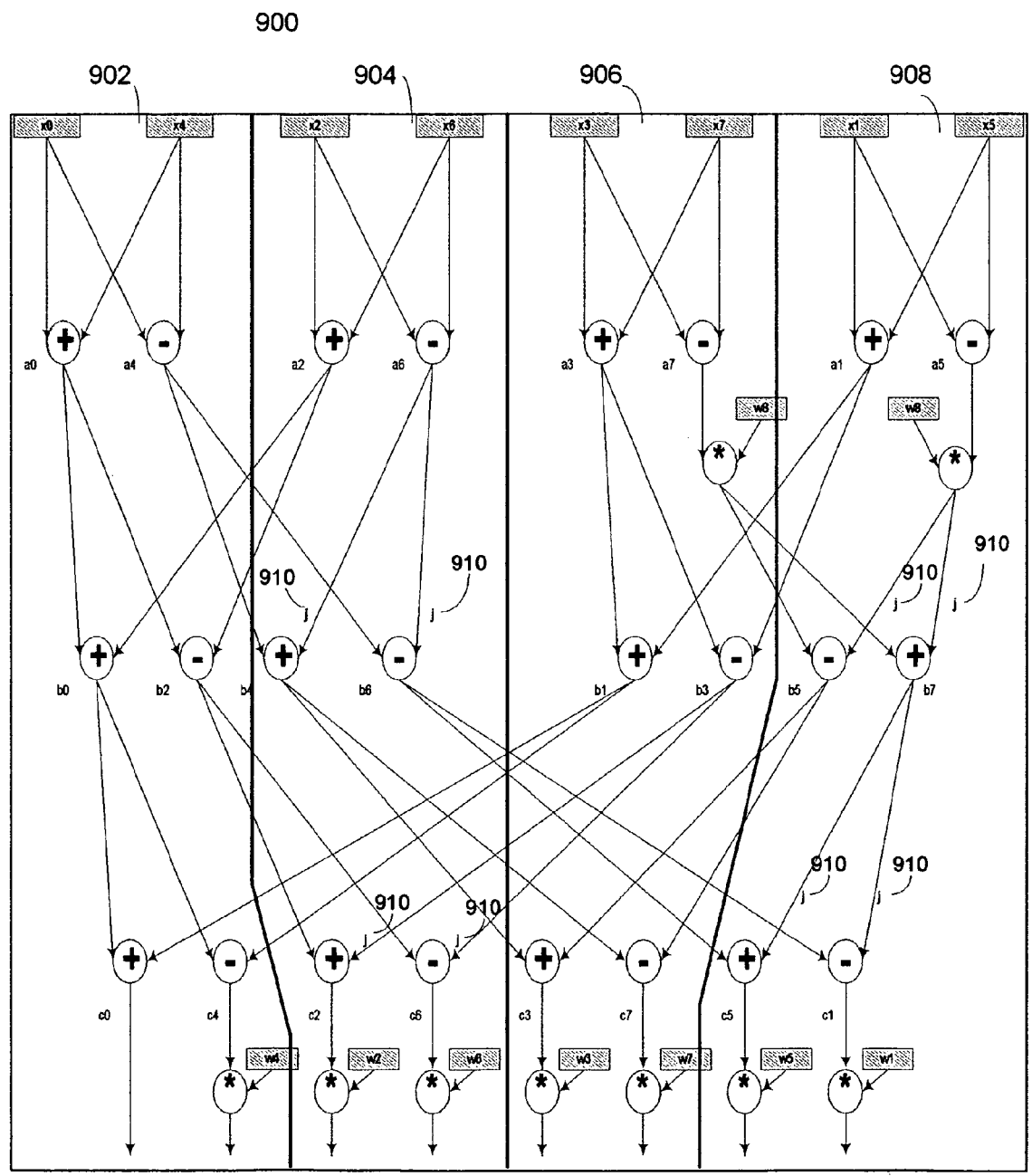
FIG. 9 is a diagram of a radix-8 butterfly architecture in accordance with an embodiment of the present invention.

In one embodiment, a clock appropriate for engine 100 can be a 141.312 MHz clock. As a result, IFFT/FFT 108 requires at least six hardware math units. In the embodiment, as shown in FIG. 9, a pipelined hardware butterfly is used to perform the math units.

According to one implementation, for each 250 µs symbol period there are 35,328 clock periods available for FFT/IFFT processing. In the implementation, butterfly 900 performs a single transform in about 10,000 clocks using a radix-8 butterfly 900. There are a number of ways that the radix-8 calculations could be scheduled across multiple clocks. Since there are 24 complex adds and nine complex multiplies per butterfly a four cycle butterfly requires at least six complex adders and 2.25 complex multipliers implemented as two complex multipliers and one real multiplier. In an embodiment, a minimal amount of hardware is used by having butterfly 900 vertically sliced across four logical time slices. Thus, the first time slice calculates (a0, a4, b1, b3, c1, c5) in block 902, the second calculates (a2, a6, b1, b3, c0, c4) in block 904, the third calculates (a3, a7, b0, b2, c2, c6) in block 906, and the fourth calculates (a1, a5, b4, b6, c3, c7) in block 908. Using vertical slicing keeps the six adders busy on every clock cycle but slightly under utilizes the multipliers. A temporary storage register shown as 1014 and 1020 in FIG. 10 at all locations in butterfly 900 where the arrows cross clock boundaries. However, the registers can be shared across multiple clocks so that only 12 are needed.

Butterfly 900 illustrates a simplified representation of the radix-8 butterfly pipeline. The maximum number of hardware elements required in any one block of butterfly 900 includes six complex adders and three complex multipliers. As shown, butterfly 900 illustrates different hardware configurations in blocks 902, 904, 906, and 908. The operations are scheduled over the blocks 902, 904, 906, and 908 over multiple clock cycles. The pipeline is started once per FFT stage and operates continuously over 512 butterflies in order to perform a 4096 point FFT or IFFT. Although there is an initial delay while the pipeline is filled, the throughput of the pipeline is one butterfly per four clocks.

The pipeline accepts data in fixed point or floating point data formats. In one embodiment, format converters are provided for use at one or both of the beginning and ending of pipeline processing to provide flexibility. The format converters enable pipeline operations to occur in a floating point format with a four bit exponent and a mantissa that gains precision after each math operation. In an embodiment, rounding can occur at the end of the pipeline.

Figure 10:
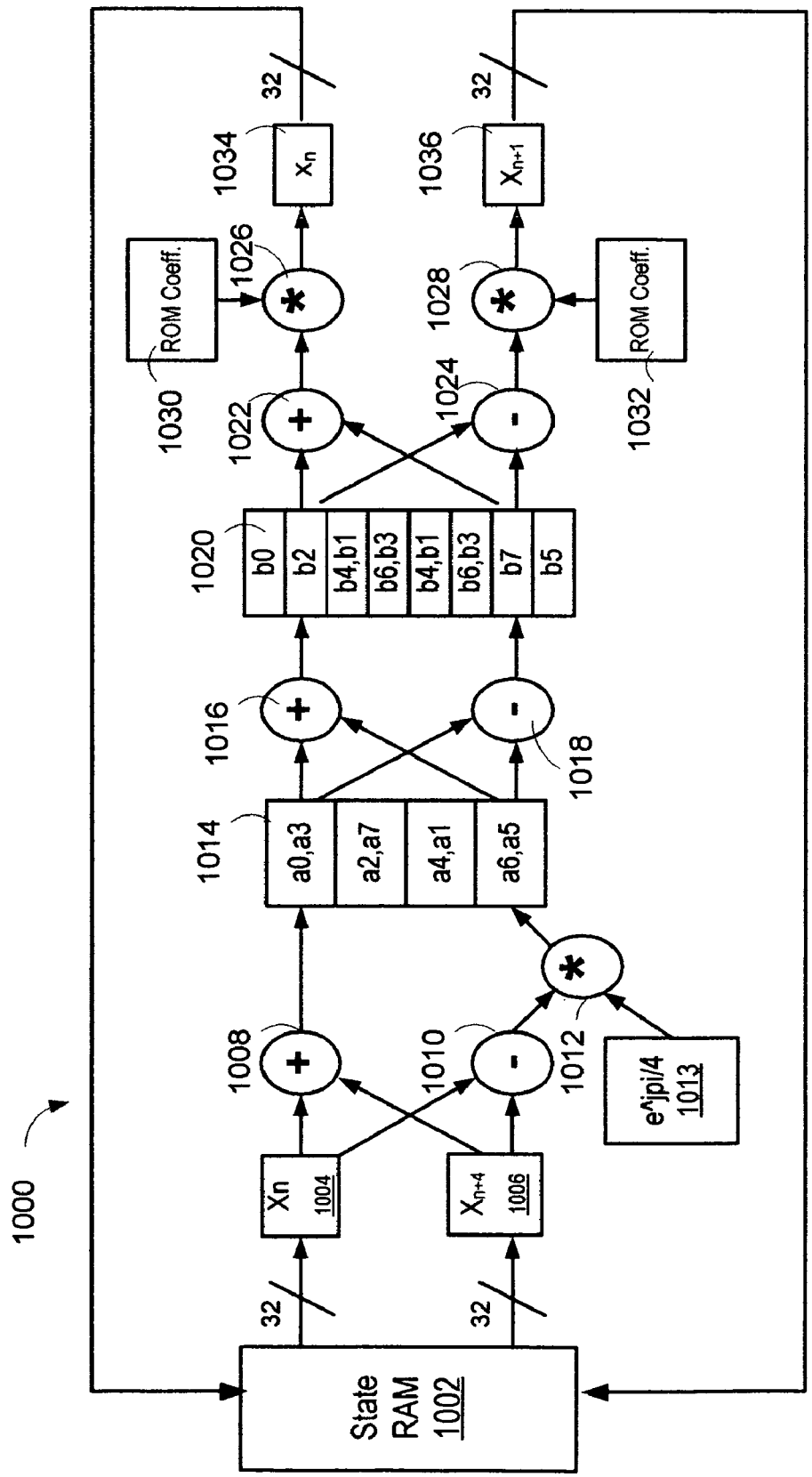
FIG. 10 is a block diagram of hardware components used to calculate partial products within a butterfly configuration for FFT and IFFT calculations in accordance with an embodiment of the present invention.

In one embodiment, butterfly 900 can be configured to alter the order of the additions and multiplies in Stage 3 such that they can be reversed to better support FFT/IFFT fold calculations. Also, j multipliers 910 can be applied to the register outputs to alter the sign of outputs and exchange real and imaginary components. Additional pipeline features can be controlled by microcode. Up to four pipeline instructions can be used to control the pipeline on consecutive clocks. The four instructions can be repeated continuously during the processing of an FFT/IFFT stage. In one embodiment, butterfly 900 can perform a radix-2 and radix-4 which require fewer microcode instructions. Referring to FIG. 10, in one approach, a radix-4 requires the use of blocks 1016, 1018, 1022, and 1024 and only two cycles of microcode instructions. For a radix-2, butterfly 900 uses blocks 1022 and 1024 and requires one microword instruction. To implement the alternative radix operations, an embodiment provides for a "no operation" (NOP) for portions of butterfly 900 that are not required.

Referring now to FIG. 10 in combination with FIG. 9, a scheduling diagram 1000 illustrates hardware to perform an exemplary vertical slice as shown in FIG. 9, blocks 902, 904, 906 and 908. FIG. 10 further illustrates that several partial products must be saved in a register, such as register 1020, for later use. The data flows from state RAM 1002 through two 32 bit buses into registers $x_n$ 1004 and $x_{n+4}$ 1006 and then to a complex adder 1008 and complex subtractor 1010. Data from complex subtractor 1010 is multiplied at multiplier 1012 by $e^{j\pi/4}$. The data is then provided to a register bank 1014 as shown. As shown, each register holds a different partial product. Register bank 1014 is coupled to complex adder 1016 and complex subtractor 1018, which operate on the partial products in register bank 1014. The outputs of complex adder 1016 and complex subtractor 1018 are provided to register bank 1020.

Register bank 1020 illustrates that partial products b1, b3, b4 and b6 are present in two registers. Data is output from register bank 1020 and provided to complex adder 1022 and complex subtractor 1024. Outputs of each adder 1022 and subtractor 1024 are then multiplied in respective multiplier 1026 and 1028, by respective ROM coefficients 1030 and 1032. Outputs of multipliers 1026 and 1028 are then provided to registers 1034 and 1036, which are each coupled back to state RAM 1002. Between registers 1034 and 1036, write cache 1035 and state RAM 1002, which operates to provide data to registers 1034 and 1036.

Referring to ROM coefficients 1030 and 1032, an embodiment provides for including 512 entries in each of ROM 1030 and 1032. Using two ROMs allows two multiplies to occur in a single clock period. Although for much of FFT and IFFT processing ROMs 1030 and 1032 require 4096 entries, symmetry between the ROMs is applied to prevent redundant entries and reduce the number. According to an embodiment, for a 8192 point transform, such as for fold stages of processing, and the like, one entry from each of ROMs 1030 and 1032 are retrieved and interpolated to produce interpolated entries to enable the 8192 point transform.

As a result of the hardware described with reference to FIG. 10, the b6 partial product, for example, must be saved in a register for five clocks. In an embodiment, a control is provided that addresses the need to expand on a four clock operation. A simple toggle register is used to toggle the addressing and cause the b4 and b1 values to alternate between registers 3 and 5 and the b4 and b6 values to alternate between registers 4 and 6. The operation of the toggle bit is controlled by instructions.

The radix-8 butterfly hardware reads two complex samples and writes two complex samples per clock. The four samples accessed on each cycle are configured to reside in separate memory banks to avoid needing dual port RAMs. The memory organization is further complicated by the data transfers between external blocks and state RAM. These transfers operate on sequential pairs of samples. To allow these transfers to occur at full speed, the even and odd samples are stored in separate memory banks via discarding bit 1 of a bit of a bank number calculated via an algorithm, such as the FAST algorithm. Bit 1 of the original address is used as part of the bank address. The IFFT pre-processing and FFT post-processing stages also put requirements on the memory organization. The following table summarizes the memory bank requirements. The table shows the indices of samples that must be stored in different memory banks for each stage of processing. Each cell in a row represents a separate memory bank. The cells within a column do not necessarily need to belong to the same memory bank. The tables assume application of the Sande-Tukey or decimation in frequency method.

TABLE 5

Memory Bank Requirements

| | Separate Memory Banks | | | |
|---|---|---|---|---|
| FFT Stage 0 | N | N + 4(512) | N + 1(512) | N + 5(512) |
| N = 0 to 511 | N + 2(512) | N + 6(512) | N + 3(512) | N + 7(512) |
| FFT Stage 1 | N | N + 4(64) | N + 1(64) | N + 5(64) |
| N = 0 to 63 | N + 2(64) | N + 6(64) | N + 3(64) | N + 7(64) |
| FFT Stage 2 | N | N + 4(8) | N + 1(8) | N + 5(8) |
| N = 0 to 7 | N + 2(8) | N + 6(8) | N + 3(8) | N + 7(8) |
| FFT Stage 3 | N | N + 4 | N + 1 | N + 5 |
| N = N + 8, N < 4096 | N + 2 | N + 6 | N + 3 | N + 7 |
| Pre/Post process | N | 4096 − N | | |
| N = 1 to 4095 | | | | |
| Data transfers | N | N + 1 | | |

For example, when N=0 the table shows that the samples in the following groups must reside in different memory banks: (0, 2048, 512, 2560), (0, 256, 64, 320), (0, 32, 8, 40), (0, 4, 1, 5), (2, 4094), and (0, 1).

Figure 11:
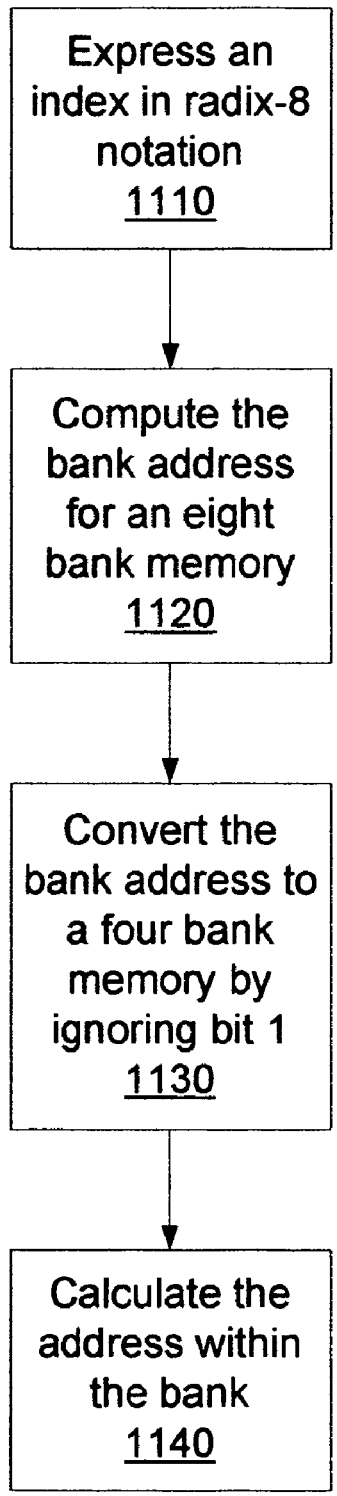
FIG. 11 is a flow diagram illustrating a method for addressing memory banks in an FFT and IFFT component in accordance with an embodiment of the present invention.

According to an embodiment, a method for addressing the memory banks is shown in FIG. 11. More particularly, FIG. 11 provides a method for the addressing for a radix-8 FFT using eight memory banks. Block 1110 provides for expressing an index in radix-8 notation: I=I(3)*512+I(2)*64+I(1)*8+I(0). Block 1120 provides for computing the bank address for an eight bank memory: B=(I(3)+I(2)+I(1)+I(0)) modulo 8. Block 1130 provides for converting the bank address to a four bank memory by ignoring bit 1: B=(b2 b1 b0), B4=(b2 b0), and saving bit 1 for use as bit 0 of an A address. Block 1140 provides for calculating the address within the bank: A=I/4. In one embodiment, bits are concatenated as follows: A={I[11:3],I[1]}. Thus, A=((Integer(I/8))*2)+((Integer(I/2)) mod 2).

Referring now to FIG. 12, table 1200 illustrates partial results during different stages of FFT and IFFT processing, RAM read access entries 1202, Stage 1 calculations 1204, Stage 1 storage 1206, Stage 2 calculations 1208, Stage 2 storage 1210, Stage 3 Calculations 1212, and RAM write access 1214. As table 1200 illustrates, bank reduction is effective because samples separated by 2, 2*8, 2*64, and 2*512 can reside in the same bank. All calculations are power of two and thus involve simple bit manipulation independent of math blocks.

During butterfly and fold processing, a same memory bank may need multiple accesses during one cycle. When this occurs for the two read operations, the pipeline is stalled by one clock so that both values can be accessed. However, an addressing conflict is uncommon and performance reduction is negligible.

A more common conflict occurs when read and write or multiple writes access the same memory bank. To avoid a large performance penalty, an embodiment is directed to providing a write cache. The cache can store up to eight pending memory writes. During normal processing, the cache controller determines which memory banks are available for writing by verifying that the same banks are not being read. If the data coming from the pipeline is destined for an available bank then it is written directly to memory. If not, then it is written to the cache. During the same cycle the cache controller will write any data that is in the cache that is destined for an available memory bank. On occasion the cache will become full. In that case the controller stops the pipeline and flushes the entire cache.

Each memory location holds a complex sample using 32 bits of data. The sample can be in a fixed point format with 16 bits for the real value and 16 bits for the imaginary or one of two floating point formats. The first floating point representation (FP2) uses two bits for the exponent and 14 bits for the mantissa for both the real and imaginary values. The second format (FP4) uses 14 bits for each mantissa and a shared four bit exponent.

The data pipeline performs all floating point operations using a four bit exponent and a mantissa that grows in size from the front of the pipeline to the back. Data converters at the front and back of the pipeline allow the data to be read and written in any of the supported formats. Normally, the input transfers are fixed point but are converted to FP2 before being written to memory and the output transfers are also fixed point. All other operations required for FFT/IFFT processing use the FP4 format for storing temporary values.

The radix-8 pipeline is largely a fixed structure. However, some amount of programmability is required to allow the structure to be used for radix-8 butterflies, IFFT pre-processing, FFT post-processing, and state memory transfers. Rather than using hardcoded execution modes, a set of microcode registers are provided that control the pipeline dataflow. When combined with a programmable address generation unit this strategy allows the FFT algorithm to be modified or pipeline to be used for non-FFT calculations. Adding this capability does not significantly increase the size of the pipeline but makes the FFT coprocessor more flexible.

The tables provided below describe the datapath microde registers.

TABLE 6

| Bit(s) | Name | R/W | Reset/power-on | Description |
|---|---|---|---|---|
| 23:21 | Reserved | R/W | 3'h0 | Reserved |
| 20:19 | Stage C - Complement Opcode | R/W | 2'h0 | Opcode for the stage C complementors.<br>2'h0 = NOP<br>2'h1 = Complement adder output<br>2'h2 = Complement subtractor output<br>3'h3 = Auto complement based on transform, adder for FFT, subtractor for IFFT |
| 18 | Stage C Fold | R/W | 1'h0 | Setup stage C for fold processing. The order of the adders and subtractors are swapped. |
| 17 | Stage C Swap | R/W | 1'h0 | When set the output of the stage C adder and subtractor are swapped before being used by the next math block. |
| 16:14 | Stage C Input | R/W | 3'h0 | Selects two of the eight stage B registers into the front of the stage C pipeline. The selection is encoded into three bits to save microcode space. The three bits determine both read addresses as follows:<br><br>Code / Normal Addresses / Munged Addresses<br>3'h0 / 0, 4 / 0, 2<br>3'h1 / 1, 5 / 1, 3<br>3'h2 / 2, 6 / 4, 6<br>3'h3 / 3, 7 / 5, 7<br>3'h4 / 0, 1 / 0, 1<br>3'h5 / 2, 3 / 2, 3<br>3'h6 / 4, 5 / 4, 5<br>3'h7 / 6, 7 / 6, 7 |
| 13:12 | Stage C Opcode | R/W | 2'h0 | Opcode for stage C adder/subtractor<br>2'h0 = NOP<br>2'h1 = Add operand 0 to 1 and subtract operand 1 from 0<br>2'h2 = Add operand 0 to 1 and subtract operand 0 from 1<br>3'h3 = Same as 2'h1 but the (0, j) multiplier is also applied to operand 1 before add/subtract. |
| 11 | Stage B Swap | R/W | 1'h0 | When set the output of the adder and subtractor are swapped before being written into the stage B registers. |
| 10 | Stage B Munge | R/W | 1'h0 | Affects the input and output addressing of the stage B registers. The munge bit toggles a state bit that controls the addressing. This is needed to allow some stage B values to be retained for more than four clocks using only four microwords. |
| 9:8 | Stage B Output | R/W | 2'h0 | Selects two of the eight stage B registers for writing by the stage B pipeline.<br><br>Code / Normal Addresses / Munged Addresses<br>3'h0 / 0, 1 / 0, 1<br>3'h1 / 2, 3 / 4, 5 |

TABLE 6-continued

| Bit(s) | Name | R/W | Reset/power-on | Description |
|---|---|---|---|---|
| 7:6 | Stage B Input | R/W | 2'h0 | 3'h2   4, 5   2, 3<br>3'h3   6, 7   7, 6<br>Selects two of the four stage A registers for input into the stage B pipeline.<br>Code   Addresses<br><br>2'h0   0, 1<br>2'h1   2, 3<br>2'h2   0, 2<br>2'h3   1, 3 |
| 5:4 | Stage B Opcode | R/W | 2'h0 | Opcode for stage B adder/subtractor<br>2'h0 = NOP<br>2'h1 = Add operand 0 to 1 and subtract operand 1 from 0<br>2'h2 = Add operand 0 to 1 and subtract operand 0 from 1<br>3'h3 = Same as 2'h1 but the (0, j) multiplier is also applied to operand 1 before add/subtract. |
| 3:2 | Stage A Output | R/W | 2'h0 | Selects two of the four stage A registers for writing by the stage A pipeline.<br>Code   Addresses<br><br>2'h0   0, 1<br>2'h1   2, 3<br>2'h2   0, 2<br>2'h3   1, 3 |
| 1:0 | Stage A Opcode | R/W | 2'h0 | Opcode for stage A adder/subtractor<br>2'h0 = NOP<br>2'h1 = Add operand 0 to 1 and subtract operand 1 from 0<br>2'h2 = Add operand 0 to 1 and subtract operand 0 from 1<br>3'h3 = Same as 2'h1 but the $\pi/4$ multiplier is also applied to operand 1 after subtraction. |

The register shown in Table 5 define a set of eight datapath microwords that can be used by the sequencer. Each microword defines the multiplexing and other controls needed by the datapath logic for one clock. These microwords are decoded into the raw controls and stored in registers before being used by butterfly 900 to prevent the decoding from being in the critical paths. Each sequencer stage, such as butterfly, fold, and the like, can use up to four microwords in one embodiment.

Table 7, below illustrates frequency map registers:

TABLE 7

| Bit(s) | Name | R/W | Reset/power-on | Description |
|---|---|---|---|---|
| 23:12 | End | R/W | 12'h0 | Ending frequency bin for a FFT/IFFT passband |
| 11:0 | Start | R/W | 12'h0 | Starting frequency bin for a FFT/IFFT passband |

The frequency map registers define the passbands for the FFT and IFFT. The first four registers (0xFFF808-0xFFF80B) are used for the FFT and the last four are used for the IFFT. The available frequency map registers are divided evenly between the channels. For a single channel configuration there are four passbands available in each direction. For two channels there are two passbands per direction per channel and for four channels there is only one passband per direction per channel.

The frequency map is used during addressing calculations for input/output frequency domain data transfers and scaling. To save processing cycles the frequency domain transfers only include the frequency bins that are in the passbands. These registers are used to map those samples into the correct place in state memory. They are also used to select the correct scaling values since the scale factors are packed in memory.

TABLE 8

Sequencer Microword Registers

| Bit(s) | Name | R/W | Reset/power-on | Description |
|---|---|---|---|---|
| 23 | Multiplier Source | R/W | 1'h0 | Determines the source for the datapath stage C multipliers during scaling operations: 0 = scaling memory, 1 = Scaling registers |
| 22 | Fold | R/W | 1'h0 | Setup the datapath pipeline for Fold processing. |

TABLE 8-continued

Sequencer Microword Registers

| Bit(s) | Name | R/W | Reset/power-on | Description |
|---|---|---|---|---|
| 21:20 | Input Format | R/W | 2'h0 | Number format at the input of the datapath pipeline (from memory or point-to-point).<br>2'h0 = Force zeros as input<br>2'h1 = Fixed - 16 bit signed 2's complement<br>2'h2 = FP2 - Signed floating point, 2 bit exponent, 14 bit mantissa:<br><real exp, real mant><imag exp, imag mant><br>2'h3 = FP4 - Signed floating point, 4 bit shared exponent, 14 bit mantissa:<br><exp[3:2], real mant><exp[1:0], imag mant> |
| 19:18 | Output Format | R/W | 2'h0 | Number format at the output of the datapath pipeline (from memory or P2P).<br>2'h0 = Force zeros as output<br>2'h1 = Fixed - 16 bit signed 2's complement<br>2'h2 = FP2 - Signed floating point, 2 bit exponent, 14 bit mantissa:<br><real exp, real mant><imag exp, imag mant><br>2'h3 = FP4 - Signed floating point, 4 bit shared exponent, 14 bit mantissa:<br><exp[3:2], real mant><exp[1:0], imag mant> |
| 17 | Data source | R/W | 1'h0 | Input source for the data pipeline:<br>0 = Memory, 1 = P2P |
| 16 | Data destination | R/W | 1'h0 | Output destination for the data pipeline:<br>0 = Memory, 1 = P2P |
| 15:12 | Pipeline delay | R/W | 4'h0 | Number of clock delays from the input of the pipeline to the output. This value can be used to adjust the pipeline timing for different configurations. |
| 11:9 | DP Uword 3 | R/W | 3'h0 | Datapath microword for cycle 3 - Selects from one of the 8 microcode registers. |
| 8:6 | DP Uword 2 | R/W | 3'h0 | Datapath microword for cycle 2 - Selects from one of the 8 microcode registers. |
| 5:3 | DP Uword 1 | R/W | 3'h0 | Datapath microword for cycle 1 - Selects from one of the 8 microcode registers. |
| 2:0 | DP Uword 0 | R/W | 3'h0 | Datapath microword for cycle 0 - Selects from one of the 8 microcode registers. |

Output Gains-4 Registers

TABLE 9

IFFT Output Gain Registers

| Bit(s) | Name | R/W | Reset/power-on | Description |
|---|---|---|---|---|
| 23:12 | Mantissa | R/W | 12'h0 | Unsigned scale factor mantissa |
| 11:8 | Exp | R/W | 4'h0 | Scale factor exponent |
| 7:0 | Reserved | R/W | 8'h0 | Reserved |

There is one gain registers provided per channel. The value is multiplied by all time domain samples of an IFFT output as they are transferred to the TX FIFO.

Address Generation Microcode-12 Registers

TABLE 10

Data Transfer Control Register

| Bit(s) | Name | R/W | Reset/power-on | Description |
|---|---|---|---|---|
| 23:19 | Reserved | R/W | 5'h0 | Reserved |
| 18 | Digit Reverse | R/W | 1'h0 | Apply digit reversal to all address calculations. For radix-4 the digits are 2 bits and for radix-8 they are 3 bits. |
| 17:16 | Multiplier Mode | R/W | 2'h0 | Addressing mode for the datapath multipliers:<br>2'h0 = NOP, multiply by 1<br>2'h1 = Twiddle factor addresses for butterflies<br>2'h2 = Scale factor addresses<br>3'h3 = Twiddle factor addresses for fold stages |
| 15:12 | AGU Mode | R/W | 4'h0 | Address generation unit mode - Determines the type of memory addresses that are generated by the AGU. |

TABLE 10-continued

Data Transfer Control Register

| Bit(s) | Name | R/W | Reset/power-on | Description |
|---|---|---|---|---|
| | | | | The AGU generates two read and two write addresses for each clock. 4'h0 = Butterfly stage 0; 4'h1 = Butterfly stage 1; 4'h2 = Butterfly stage 2; 4'h3 = Butterfly stage 3; 4'h4 = Butterfly stage 4; 4'h5 = Butterfly stage 5; 4'h6 = Butterfly stage 6; 4'h7 = Butterfly stage 7; 4'h8 = Increment; 4'h9 = Fold - Start at (1, FFT_SIZE−1) and increment by (1, −1); 4'ha = Frequency Map - Increment through addresses using the start and end values of the frequency map. When an end value is reached, jump to the next map. 4'hb = Modulo - Start at the starting address in the modulo register and wrap to zero when the end address is reached. 4'hc = Fill - Increment through FFT_SIZE/4 addresses and apply each address to all four state RAM banks. |
| 11:0 | Clock count | R/W | 12'h0 | Number of cycles to run the sequencer and AGU microwords. |

IFFT Output Modulo-4 Registers

TABLE 11

Modulo Registers

| Bit(s) | Name | R/W | Reset/power-on | Description |
|---|---|---|---|---|
| 23:12 | End | R/W | 12'h0 | Modulo address for the IFFT output transfer. The memory address wraps to 0 after this limit is reached. |
| 11:0 | Start | R/W | 12'h0 | Starting memory address for the IFFT output transfer |

The IFFT modulo registers are provided to facilitate cyclic extension insertion. The output transfer to the TX FIFO can be setup to repeat both the beginning and end of the symbol. For example, if the start address is set to FFT_SIZE−128, the end address to FFT_SIZE, and the clock count is set to FFT_SIZE+256 then the output transfer will be <last 128 samples> <full symbol> <first 128 samples>. That will allow the TX FIFO to build the cyclic extension without needing random access to the FIFO memory.

Framer/Deframer Operation
VDSL SRS Block

Figure 13:
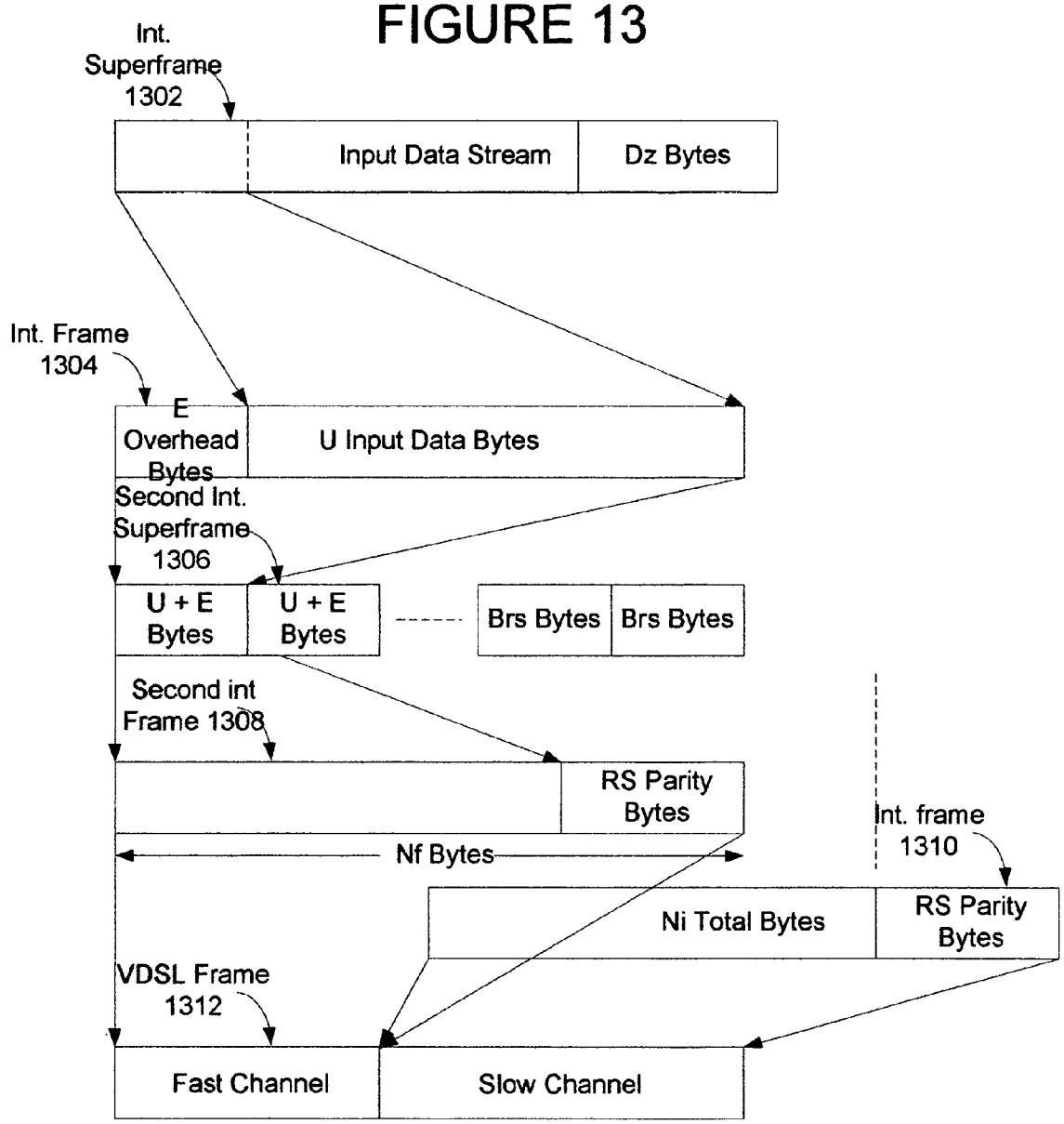
FIG. 13 is block diagram illustrating the frame structure of a VDSL superframe.

A VDSL frame is created as shown in FIG. 13. The VDSL frames are formed starting with a fixed length section of the input data stream 1302 which will be encoded into multiple frames. The input data stream is appended with Dz dummy bytes to yield an overall user data rate which is an integer multiple of 64 kb/s. This step is called payload adaptation because it adapts the payload data-rate to the line data rate by inserting appropriate number of dummy bytes. Input data stream 1302 is partitioned into segments of length U bytes. E overhead bytes are prepended to form intermediate frame 1304. The E overhead bytes contain control information necessary to maintain a data link and monitor line conditions. This overhead channel is also referred to as OAM (Operation and Maintenance) channel. The U+E bytes form intermediate frame 1304.

After this step, a sequence of N packets of (E+U) bytes shall be RS-encoded. In order to achieve an integer number of RS-codewords per N packets, an appropriate number of RS-dummy bytes (BRS) may have to be inserted. The RS-codeword length is equal to the parameter N. Then this intermediate frame consisting of message bytes for N codewords is segmented into blocks of K bytes each and R parity bytes are inserted between those blocks. Here K is the number of information bytes in every RS codeword. (i.e. K=N−R).

An analogous procedure is performed on a second data stream to produce slow intermediate frame 1310. Slow intermediate frame 1310 is interleaved as described below and appended to second intermediate frame 1308 to form VDSL frame 1312.

One component of a VSDL system is the framer, which is collectively referred to as the Framer/Scrambler/Reed-Solomon Encoder or SRS 105 described above. The framer accepts as input multiple digital data streams. These streams may, for example, be asynchronous transfer mode (ATM) packets containing user data or logical link control (LLC) data for control and configuration of the logical channels carried over the VDSL channel. This interface is defined herein as the α/β interface.

A function of the framer is to read data from these multiple data streams at a constant data rate and to produce a new data stream compatible with the I interface as defined in the VDSL standard. DRS 111, which operates as a deframer, performs deframing, receiving a data stream on the I interface and separating this incoming data stream into one or more logical channels on the α/β interface.

Figure 14:
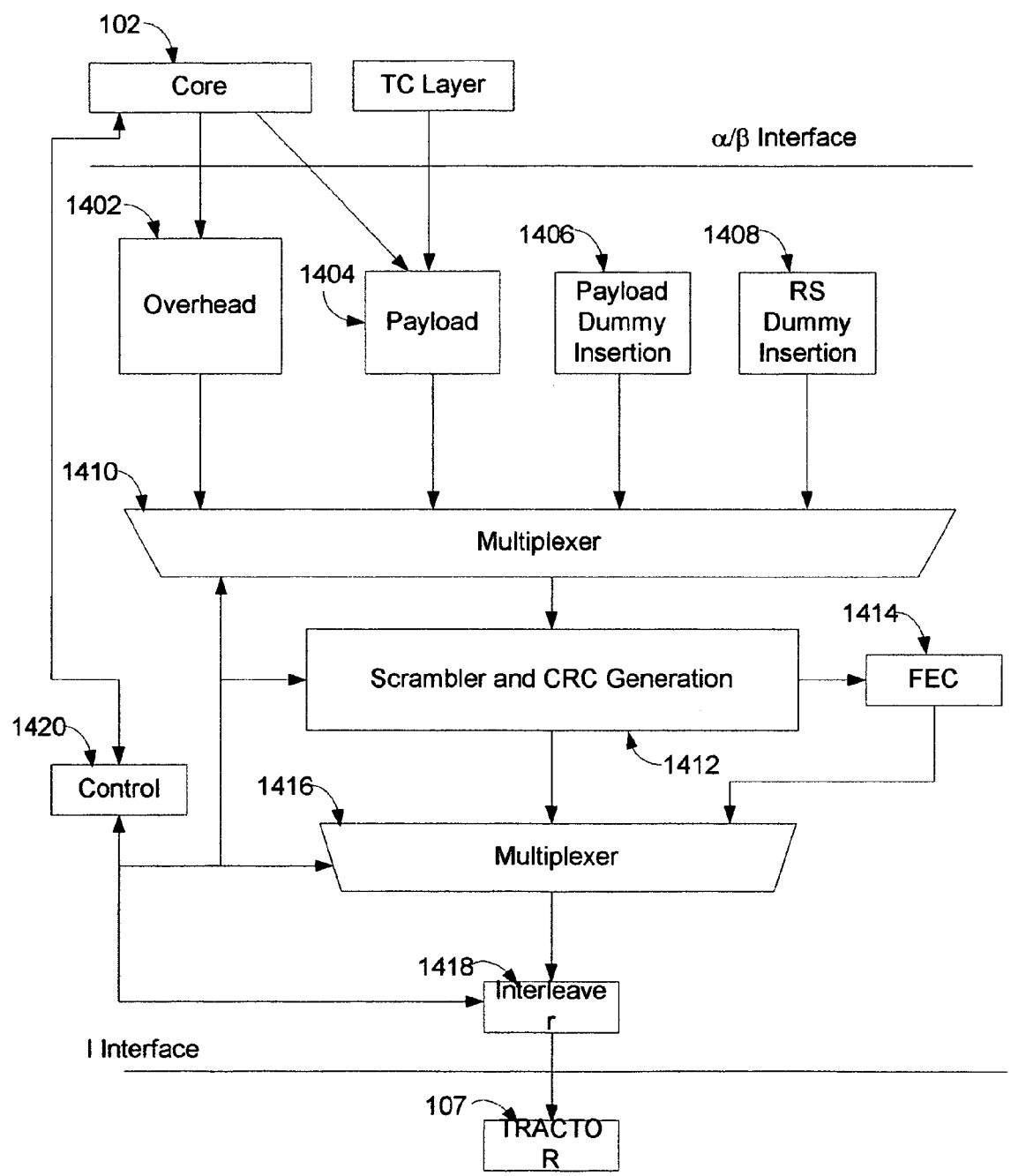
FIG. 14 is a block diagram of an implementation of a framer in accordance with an embodiment of the present invention.

A diagram of the framer functionality is shown in FIG. 14. The framer accepts input from many different sources. The data can be divided into three types depending on how it will be sent over the VDSL physical channel. Control information is given a special logical channel, referred to as the overhead channel.

In the transmit direction this channel is signified by Overhead. The overhead includes control data for managing the logical and physical VDSL channel. These control data include the cyclic redundancy check (CRC), embedded operations channel (EOC), VDSL or ADSL overhead control (VOC/AOC), network timing reference (NTR), indicator bytes (IB) and synch bytes. In an embodiment, the overhead Channel can receive data from a programmable device such as core 102. These fields are assembled in overhead 1402.

The VDSL standard contains two types of physical channels for the transmission of user data. These are referred to as fast and slow channels. In an embodiment the source of the data can be either the core 102 or the TC-Layer through fifos 120. The fast channels contain minimal or no interleaving to minimize latency at the expense of error resiliency. In general, a VDSL modem can transport more than one fast channel. The blocks that create the fast channels within the framer are identical on all fast channels.

The slow channel is similar to the fast channel except that interleaving is added to the coded data stream. This adds significant delay to the channel but also adds resilience to burst errors. A VDSL modem may transmit more than one slow channel. The data may be any type of data though the data will usually arrive from a source which is not sensitive to delay. An example of a typical data source is a TCP-IP datagram encapsulated into ATM cells.

As shown in FIG. 13 both Fast and Slow channels contain overhead, payload, payload dummy, and RS dummy bytes. The overhead and payload bytes are provided by Overhead 1402 and payload 1404. The payload dummy bytes are provided by payload dummy 1406 and the RS dummy bytes are provided by RS dummy 1408.

As shown in FIG. 13 the four fields of the a VDSL frame are time multiplexed together. The time multiplexing is accomplished by multiplexer 1410. The multiplexer is under the control of control 1420. Multiplexer 1410 accepts the outputs of overhead 1402, payload 1404, payload dummy 1406, and RS dummy 1408. Controller 1420 is configured by Core 102 with the lengths of the overhead, payload, payload dummy, and RS dummy fields of each frame. From this configuration data control 1420 configures multiplexer 1410 to select the appropriate input at the appropriate time to generate a VDSL frame.

The output of multiplexer 1410 is passed to scrambler and CRC generation 1412. This blocks scrambles the data and generates a CRC for error detection. The CRC is generated over all data except the CRC field.

The output of scrambler and CRC generation 1412 is passed to RS encoder 1414. RS encoder 1414 accepts the input data and produces the parity bytes of a Reed-Solomon error correction code. The output of scrambler and CRC generator 1412 is also passed to multiplexer 1416. Multiplexer 1416 time multiplexes the data output from scrambler and CRC generator 1412 and RS encoder 1414 under the control of controller 1420.

The output of multiplexer 1416 is passed to interleaver 1418. Interleaver 1420 interleaves, or scrambles in time, the order of the bytes. The method of interleaving is controlled by control 1420 as configured by Core 102. For the case of a fast channel no interleaving is performed. For the case of a slow channel the interleaving method is controlled by Core 102 through control 1420.

Figure 15:
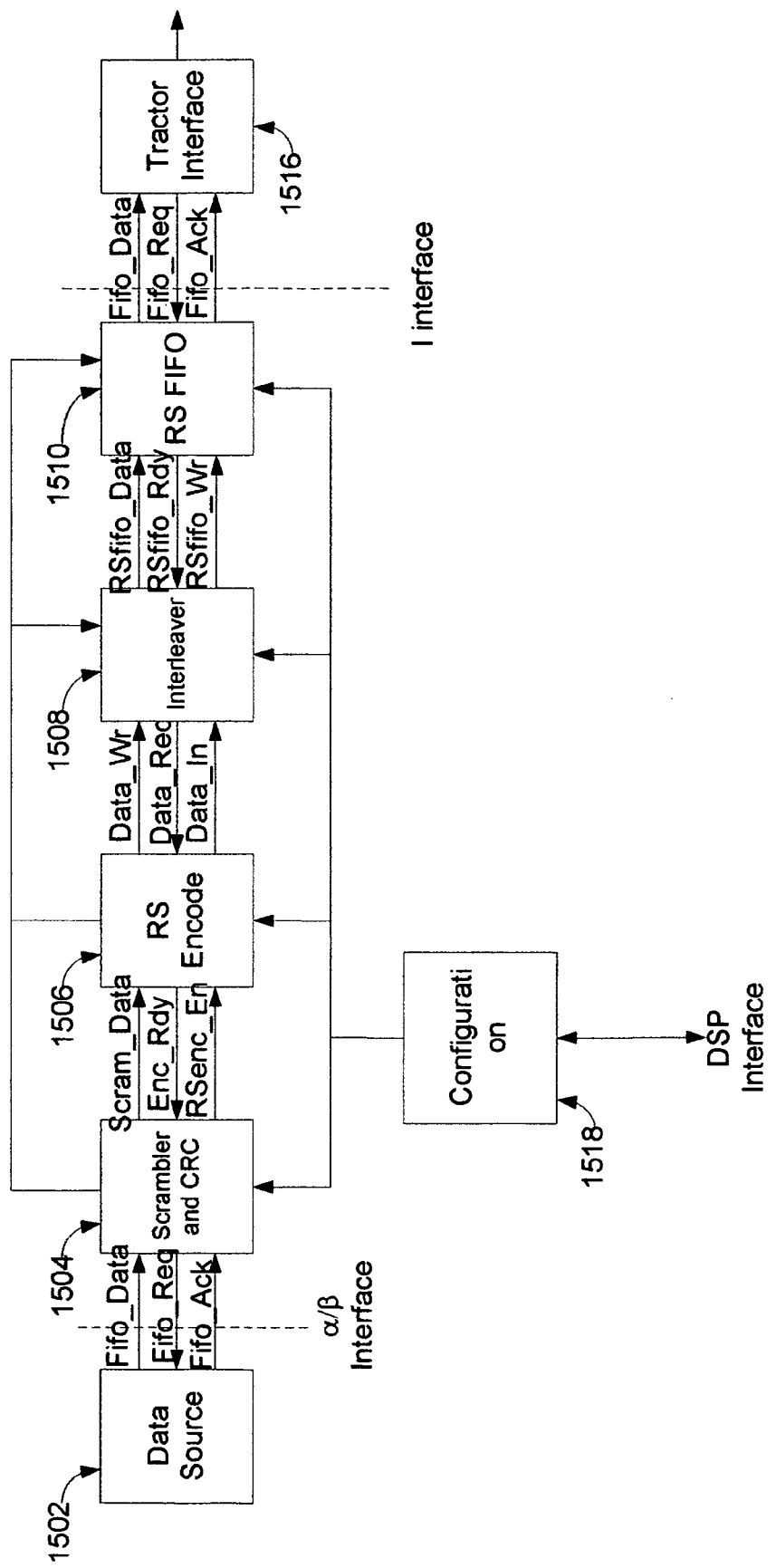
FIG. 15 is a block diagram of a hardware implementation of a framer in accordance with an embodiment of the present invention.

A block diagram of the framer hardware is shown in FIG. 15. The hardware is configured to operate on the multiple channels of data in a serial, time sliced manner. Therefore only one scrambler, FEC, and interleaver are required even when multiple channels are present. Data source 1502 supplies data to scrambler 1504. Scrambler 1504 generates a CRC. A separate CRC is generated for every fast and slow channel. The CRC is generated in a serial fashion. When all data in a given logical channel has been processed by the CRC encoder the results are passed to the DSP for inclusion in the Overhead channel. Alternatively, the CRC may be passed directly to data source 1502 for inclusion in the overhad channel. In an embodiment, data source 1502 includes a Utopia interface, an Ethernet interface, and an interface to a programmable processor, for example a DSP. The Ethernet and Utopia interfaces share a common data FIFO located in the memory space of the DSP. The sharing of a common FIFO is possible as Utopia and Ethernet interfaces are not used simultaneously. A small input FIFO is used to buffer the incoming DMA transfers. When data source 1502 FIFO reaches a low data point, data source 1502 requests a DMA transfer from core 102. Core 102 configures the DMA transfer through configuration block 1518. Once configured, data source 1502 controls the DMA transfer without further core 102 intervention.

Data source 1502 feeds scrambler 1504 which randomizes the data from a given channel and appends a CRC to enable verification of data integrity at the receiver. Data transfers from data source 1502 to scrambler 1504 are initiated when scrambler 1504 activates the FIFO_REQ signal. In response, data source 1502 places data on the FIFO_DATA bus. When FIFO_DATA is stable, data source 1502 activates signal FIFO_ACK. The FIFO_ACK signal informs scrambler 1504 that data is valid at which point scrambler 1504 will latch the data on FIFO_DATA and de-assert the FIFO_REQ signal which completes the transfer. This type of data transfer is referred to as a request/acknowledge (REQ/ACK) transfer. Scrambler 1504 receives control information from configuration 1518.

Data from scrambler 1504 passes to either RS encoder 1506, interleaver 1508, or RS FIFO 1510 under the control of configuration 1518. The multiple possible destinations impart the flexibility in the hardware to provide framing functionality for OVERHEAD, fast, and slow channels. The use of REQ/ACK transfers allows routing of data by controlling the routing of the request and acknowledge lines. For example, if a fast channel is to be framed, the scrambler 1504 will pass data to RS encoder 1506, the output of RS encoder 1506 will then be passed to RS FIFO 1510, bypassing interleaver 1508 since fast channel data is not interleaved. RS encoder 1506 adds data bytes to the data stream to allow for error correction at the receiver. The number of bytes in the Reed Solomon codeword and the number of parity and data bytes are under the control of configuration 1518.

Interleaver 1508 stores input data bytes and outputs these bytes in a different order. The ordering of the output bytes is under the control of configuration 1518 through the parameters I and M which represent the interleaving block length and interleaving depth parameter, respectively, of the interleave buffer. Interleaver 1508 contains byte wide memory to simplify access for the complex interleaver addressing modes. In the worst case, the bandwidth into and out of the memory is a total of 25 MBs. Since the DSP has higher memory requirements for training than showtime and the interleaver is not active during training, the 32 KB of interleave memory is shared with the DSP. This sharing is accomplished by separating the memory into four banks of 8192×8 each and mapping these banks as 32 bit words in the DSP's X:Y address space. The four banks are multiplexed so that they appear as a 32 KB linear array to the interleaver hardware.

RS FIFO 1510 stores data until required by the TRACTOR 107 interface 1512. RS FIFO 1510 contains a small FIFO to allow data to be rapidly fed to the Tractor interface when requested. When this FIFO is emptied to the point that only a predetermined number of data bytes remain, RS FIFO 1512 will request data from either interleaver 1508, RS encoder 1506, or scrambler 1504. The destination of the request is under the control of controller 1518 which will be programmed according to the channel type.

The following parameters are programmed for each channel into configuration 1518:

| | |
|---|---|
| Number of overhead bytes/symbol | E |
| Number of payload bytes/symbol | U |
| Number of bytes/Reed Solomon codeword | N |
| Number of parity bytes per Reed Solomon codeword | R |
| Reed Solomon Dummy bytes | Brs |
| Payload Dummy bytes | Dz |
| Number of frames/superframe | Sfrm |
| Interleaver parameters | I, M and D |

The interleaving parameters I and M apply to VDSL. The parameter D applies to ADSL. The parameters can use the same configuration register because they are mutually exclusive parameters.

The above parameters are stored in registers internal to configuration 1518 and are accessible from core 102. The use of configuration parameters in this manner allows the framer to support ADSL, with a register set for each channel type. SEQp, Tp, Bp, Mp, Rp, Np, Sp are parameters described in the ITU Recommendation G.992.5. The ADSL standard requires no dummy bytes in the framer and has a fixed 68 frames in each superframe. The interleaver used in ADSL differs from that used in VDSL. The ADSL interleaver can be specified with a single parameter, the interleaver depth, D. In all other respects the ADSL frame is a subset of the VDSL frame. Thus, the framer will produce an ADSL frame by setting Brs to 0, Dz to 0, Sform to 68 and interleaver depth D.

Similarly, the VDSL framer can support ADSL+ and ADSL2+ by setting Brs to 0, Dz to 0, Sfrm to SEQp, U is mapped to (Tp*(Bp+1)−1), N is mapped to (Mp*(Bp+1)+Rp), and P is mapped to Np/Sp. When Np/Sp is not an integer value, the parameter P may have to be changed from symbol to symbol, depending on the number of bits processed during that symbol. As with ADSL, the interleaver depth is set to D.

One significant advantage of the framer implementation shown in FIG. 15 over prior art methods is the pipelined architecture. Using the REQ/ACK bus structure between blocks and cascading the blocks as shown in FIG. 15 allows the framer to produce data on demand. When Tractor 1516 requires data, it reads the required data bytes from RS FIFO 1510. When a given block requires input data, this block issues a request for data. The request is routed to the appropriate second block under the control of configuration 1518. The on-demand transfer of data under the control of controller 1518 provides a flexible structure with minimal memory requirements. The DSP writes all necessary channel parameters to configuration 1518. The hardware then produces these bytes in the sequence dictated by the VDSL standard. Separate configuration registers are present for each of the logical channels in configuration 218. This allows supporting multiple latency paths and multiple modems.

In general, the number of overhead bytes, E, and number of payload bytes, U, transmitted every RS codeword varies even on a single logical channel. Therefore, prior art solutions calculate U and E every codeword. However, the pattern of parameters on any given logical channel is repeated with a repetition period of at most every N codewords, where N is the number of RS codewords in a superframe. Therefore, the values of U and E for each codeword can be pre-computed and saved in a lookup table in core 102. Precomputing and storing these parameters allows the parameters associated with a given logical channel to be calculated once when the channel is created avoiding the computational burden of calculating U and E every frame.

The lookup table containing the channel parameters can be configured to contain N sets of U and E. In an embodiment, the table contains a length N array with each element of the array containing a structure with the pre-computed U and E in the format required by the framer/deframer. A pointer into the array points to the next element of the array to be written to configure the framer/deframer. After the start of a codeword, core 102 writes the parameters for the next frame and increments the pointer. When the end of the table is reached, the pointer is reset to the top of the table and the process repeated as long as the logical channel is active.

The dummy bytes insure that any amount of data assigned for transmission on a given logical channel will be consumed at a frame boundary. Thus, there is no residual payload or overhead data left for the next symbol. Dummy bytes simplify switching of the context to a different logical channel. In an alternative embodiment, the number of payload and overhead bytes to be loaded can be computed every codeword. This method conserves data memory space at the cost of computational complexity.

In an embodiment, hardware in the framer/deframer is configured to keep track of the state and track the number of dummy bytes to be inserted or removed. Thus, core 102 functionality is reduced to identifying the number of bytes to read from payload and overhead bytes. The DRS and SRA then are responsible for ordering the dummy bytes and tracking timing of byte transmissions.

To illustrate an embodiment of VDSL framing, an example is provided wherein the parameters are as follows: N=12; R=2; K=N−R=10; E=1; U=6

The framing pattern is such that it repeats after every N symbols. In this case, N=12.

Considering the framing for the first 12 symbols, an abstraction of a raw data stream is as follows:

| | | | | | |
|---|---|---|---|---|---|
| u00 | u01 | u02 | u03 | u04 | u05 |
| u10 | u11 | u12 | u13 | u14 | u15 |
| u20 | u21 | u22 | u23 | u24 | u25 |
| u30 | u31 | u32 | u33 | u34 | u35 |
| u40 | u41 | u42 | u43 | u44 | u45 |
| u50 | u51 | u52 | u53 | u54 | u55 |
| u60 | u61 | u62 | u63 | u64 | u65 |
| u70 | u71 | u72 | u73 | u74 | u75 |
| u80 | u81 | u82 | u83 | u84 | u85 |
| u90 | u91 | u92 | u93 | u94 | u95 |
| ua0 | ua1 | ua2 | ua3 | ua4 | ua5 |
| ub0 | ub1 | ub2 | ub3 | ub4 | ub5 |

An abstraction of the overhead data stream for the first 12 symbols is as follows:

| | | | | | | | |
|---|---|---|---|---|---|---|---|
| | | | | e00 | | | |
| | | | | e10 | | | |
| | | | | e20 | | | |
| | | | | e30 | | | |
| | | | | e40 | | | |
| | | | | e50 | | | |
| | | | | e60 | | | |
| | | | | e70 | | | |
| | | | | e80 | | | |
| | | | | e90 | | | |
| | | | | ea0 | | | |
| | | | | eb0 | | | |

The number of RS dummy bytes can be expressed as Drs=[N*(E+U)/K]*K−N*(E+U)=[12*7/10]*10−12*7=90−84=6: Drs0, Drs1, Drs2, Drs3, Drs4, Drs5

Arranging the data in accordance with the VDSL ITU Recommendation:

| | | | | | | | |
|---|---|---|---|---|---|---|---|
| e00 | u00 | u01 | u02 | u03 | u04 | u05 | Drs0 |
| e10 | u10 | u11 | u12 | u13 | u14 | u15 | Drs1 |
| e20 | u20 | u21 | u22 | u23 | u24 | u25 | Drs2 |
| e30 | u30 | u31 | u32 | u33 | u34 | u35 | Drs3 |
| e40 | u40 | u41 | u42 | u43 | u44 | u45 | Drs4 |
| e50 | u50 | u51 | u52 | u53 | u54 | u55 | Drs5 |
| e60 | u60 | u61 | u62 | u63 | u64 | u65 | |
| e70 | u70 | u71 | u72 | u73 | u74 | u75 | |
| e80 | u80 | u81 | u82 | u83 | u84 | u85 | |
| e90 | u90 | u91 | u92 | u93 | u94 | u95 | |
| ea0 | ua0 | ua1 | ua2 | ua3 | ua4 | ua5 | |
| eb0 | ub0 | ub1 | ub2 | ub3 | ub4 | ub5 | |

Thus, 90 data bytes are generated. Each R/S codeword has K=10 data bytes. So this data generates (90/10=9) R/S codewords. The number of parity bytes added is 9*R=18. With the added parity bytes the total number of bytes is 90+18=108.

The 108 bytes include 12*6=72 U bytes, 12*1=12 E bytes, 6 R/S dummy bytes and 18 parity bytes. From the above bytes 10 bytes are picked every codeword and 2 parity bytes are added. The data stream after operations would include the following nine codewords:

| | | | | | | | | | | |
|---|---|---|---|---|---|---|---|---|---|---|
| e00 | u00 | u01 | u02 | u03 | u04 | u05 | Drs0 | e10 | u10 | p00 | p01 |
| u11 | u12 | u13 | u14 | u15 | Drs1 | e20 | u20 | u21 | u22 | p10 | p11 |
| u23 | u24 | u25 | Drs2 | e30 | u30 | u31 | u32 | u33 | u34 | p20 | p21 |
| u35 | Drs3 | e40 | u40 | u41 | u42 | u43 | u44 | u45 | Drs4 | p30 | p31 |
| e50 | u50 | u51 | u52 | u53 | u54 | u55 | Drs5 | e60 | u60 | p40 | p41 |
| u61 | u62 | u63 | u64 | u65 | e70 | u70 | u71 | u72 | u73 | p50 | p51 |
| u74 | u75 | e80 | u80 | u81 | u82 | u83 | u84 | u85 | e90 | p60 | p61 |
| u90 | u91 | u92 | u93 | u94 | u95 | ea0 | ua0 | ua1 | ua2 | p70 | p71 |
| ua3 | ua4 | ua5 | eb0 | ub0 | ub1 | ub2 | ub3 | ub4 | ub5 | p80 | p81 |

The 12 frames corresponding to the nine codewords above are as follows:

| | | | | | | | | |
|---|---|---|---|---|---|---|---|---|
| e00 | u00 | u01 | u02 | u03 | u04 | u05 | Drs0 | e10 |
| u10 | p00 | p01 | u11 | u12 | u13 | u14 | u15 | Drs1 |
| e20 | u20 | u21 | u22 | p10 | p11 | u23 | u24 | u25 |
| Drs2 | e30 | u30 | u31 | u32 | u33 | u34 | p20 | p21 |
| u35 | Drs3 | e40 | u40 | u41 | u42 | u43 | u44 | u45 |
| Drs4 | p30 | p31 | e50 | u50 | u51 | u52 | u53 | u54 |
| u55 | Drs5 | e60 | u60 | p40 | p41 | u61 | u62 | u63 |
| u64 | u65 | e70 | u70 | u71 | u72 | u73 | p50 | p51 |
| u74 | u75 | e80 | u80 | u81 | u82 | u83 | u84 | u85 |
| e90 | p60 | p61 | u90 | u91 | u92 | u93 | u94 | u95 |

| | | | | | | | | |
|---|---|---|---|---|---|---|---|---|
| ea0 | ua0 | ua1 | ua2 | p70 | p71 | ua3 | ua4 | ua5 |
| eb0 | ub0 | ub1 | ub2 | ub3 | ub4 | ub5 | p80 | p81 |

Each row above represents the data that is sent out every frame (nine bytes in this case). The lookup tables in DSP would contain the number of payload bytes and number of overhead bytes consumed by the SRS block during each symbol. In this case, the tables would be as follows:
U_lut={6, 6, 6, 5, 7, 5, 5, 6, 8, 6, 6, 6}
E_lut={2, 0, 1, 1, 1, 1, 1, 1, 1, 1, 1, 1}

The parity bytes and Dummy bytes Drs0 to Drs5 are internally generated by SRS. The U bytes are provided by the data source (Utopia or MII) and the E bytes are internally generated by the DSP.

In multi-channel ADSL mode the SRS and TRACTOR functions must be shared between up to four channels. Each processor completes an entire symbol of processing for one channel before moving to the next. The memory and other resources available for supporting VDSL are enough to support four ADSL channels with the exception of the interleave memory. In the worst case the ADSL channels can use more than the available 32 Kbytes of memory requiring external memory or DSP memory to be used for the interleave function.

Deframer Operation Based on R/S Codewords

The operation of the deframer is essentially the reverse of the framer. The deframer accepts physical layer data from the I interface and parses this data into logical channels at the α/β interface.

Figure 16:
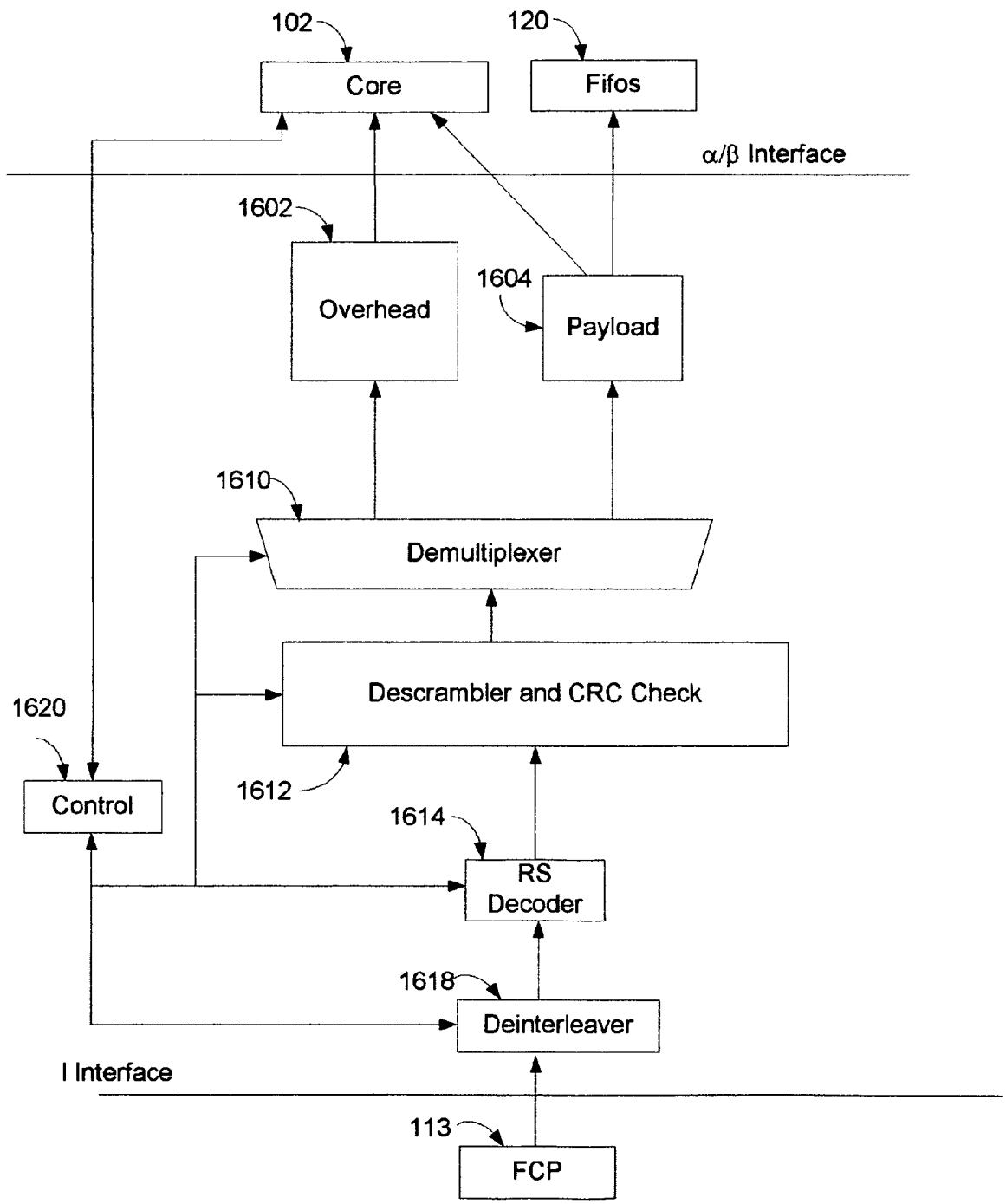
FIG. 16 is a block diagram of an implementation of a deframer in accordance with an embodiment of the present invention.

Referring to FIG. 16, a block diagram of the deframer is shown. The deframer accepts data FCP 113 which is passed to deinterleaver 1618. If the data is a part of a slow channel, deinterleaver 1618 reverses the randomization of the data performed by interleaver 1418. If the data is a part of a fast channel data passes through deinterleaver 1618 unaltered. The type of deinterleaving is controlled by control 1620 which is programmed by core 102.

Deinterleaved data from deinterleaver 1618 is passed to RS decoder 1614. RS decoder 1614 performs error correction on the received data, using the redundant bytes added in FEC 1414 to correct errors in the received data stream. In this process the redundant bytes are removed from the data stream. Parameters of the RS decoding are controlled by controller 1620 as programmed by core 102.

RS Decoder 1614 passes data to descrambler and CRC check 1612. Descrambler and CRC check 1612 descrambles the received data. The descrambling is the inverse of the scrambling performed in 1412. In addition, descrambler and CRC check 1612 verifies the integrity of the received data by check that the CRC appending by scrambler and CRC generator 1412. The results of the CRC check are reported to core 102 through control 1620.

The output of descrambler and CRC check 1612 is passed to demultiplexer 1610. Demultiplexer 1610 divides the incoming data stream into the overhead and payload bytes. Demultiplexer 1610 blocks data bytes of corresponding to the payload dummy and RS dummy bytes. The separation is accomplished under the control of control 1620 which switches output of demultiplexer 1610 to switch the output in time. The exact points in time in which control 1620 switches the output of demultiplexer 1610 is configured in core 102.

The payload output of demultiplexer 1610 is sent to payload 1604 which provides buffering for an interface to the TC layer through fifos 120 or to core 102. The overhead output of demultiplexer 1610 is sent to overhead 1602 and then to core 102.

Figure 17:
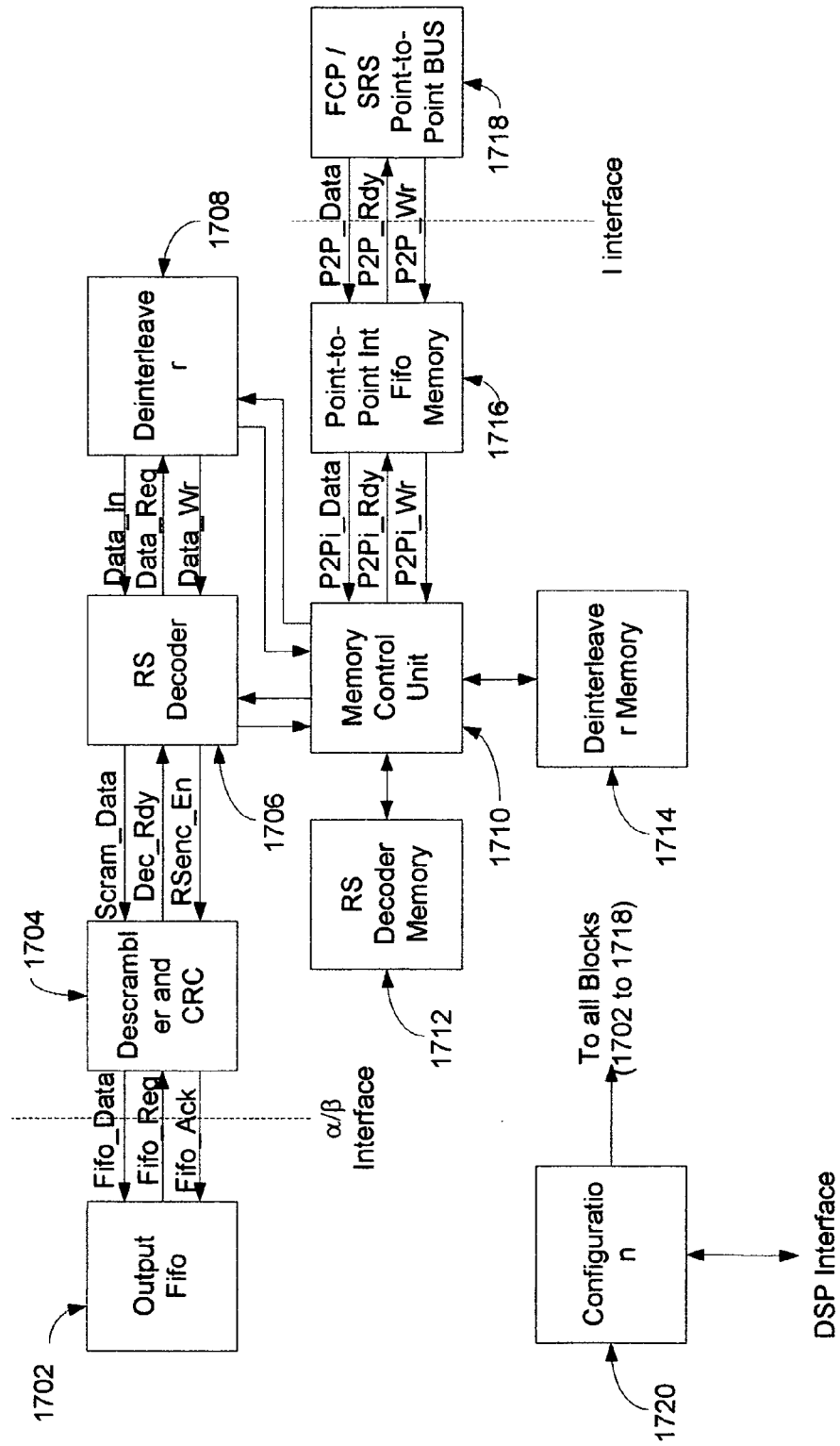
FIG. 17 is a block diagram of the hardware implementation of a deframer in accordance with an embodiment of the present invention.

A block diagram of the hardware for an embodiment of the deframer is shown in FIG. 17. The hardware is configured to operate on the multiple channels of data in a serial, time-sliced manner. Therefore, one hardware block performs the functions of descrambling, error correction, and deinterleaving. Only one block is required even when multiple channels are present. Data is sourced from FCP/SRS Point-to-Point bus 1718 described above. The data stream is a single data stream for the descrambler and CRC machinery. The data is separated into different logical channels by a state machine which keeps track of the overhead data and payload data.

FCP/SRS Point-to-Point bus 1718 feeds Point-to-Point FIFO 1716. Point-to-Point FIFO 1716 provides a FIFO to allow rapid transfers of data between FCP/SRS Point-to-Point bus 1718 and the DRS block. Without buffering, the point-to-point bus could not transfer data more rapidly than the deframer could transfer the data.

Data in point-to-point (P2P) FIFO 1716 feeds data to memory control unit 1710. Memory control unit 1710 provides several functions. First, memory control unit 1710 controls the movement of data between Reed Solomon decoder 1706, Reed Solomon (R/S) decoder memory 1712, deinterleaver 1708, deinterleaver memory 1714, and point-to-point FIFO 1716.

If the logical channel being processed is a slow channel, data from P2P FIFO 1716 is sent to deinterleaver memory 1714 via memory control unit 1710. Once an entire R/S frame is sent to deinterleaver memory 1714, deinterleaver 1708 requests data from deinterleaver memory 1714. The request and transfer take place through memory control unit 1710. Deinterleaver 1708 requests data from deinterleaver memory 1714 in an order that is the inverse of the ordering used in the interleaver 1508 in the framer. Therefore, the order of the bytes leaving deinterleaver 1708 will be the same as the ordering of the bytes entering the interleaver 1508 in the framer.

Data output from deinterleaver 1708 is passed to R/S decoder 1706. The R/S decoder 1706 requires storage of a full 255 byte codeword to perform the decoding. This storage is provided by R/S decoder memory 1712. Data is passed between R/S decoder 1706 and R/S decoder memory 1712 by memory control unit 1710.

Decoded data from R/S decoder 1706 is passed to descrambler/CRC 1704. Descrambler 1704 performs the inverse of the scrambler 1504 in the framer. The CRC is computed for every superframe and reported to core 102. Core 102 can then match it with the CRC received on the overhead channel. In case of no errors, the data leaving descrambler 1704 will be identical to the data entering the scrambler in the framer. Output from descrambler/CRC 1704 is placed in output FIFO 1702.

Fast channel operation is very similar to slow channel except data is transferred from P2P FIFO 1716 directly to R/S decoder 1706 instead of to deinterleaver memory 1714.

The deframer will receive one complete RS codeword and process the entire codeword before proceeding to the next codeword. Processing a full codeword in a single pass makes storage of the context unnecessary. Configuration 1720 provides control of the hardware in the deframer. Configuration 1720 interfaces to the DSP. The following parameters are programmed for each logical channel:

| | |
|---|---|
| Number of overhead bytes/symbol | E |
| Number of payload bytes/symbol | U |
| Number of bytes/Reed Solomon codeword | N |
| Number of parity bytes per Reed Solomon codeword | R |
| Reed Solomon Dummy bytes | BRS |
| Payload Dummy bytes | Dz |
| Number of frames/superframe | Sfrm |
| Interleaver parameters | I, M, D |

These parameters are stored in registers internal to configuration 1720 and are accessible from the DSP. The use of configuration parameters in this manner allow the framer to support ADSL. The ADSL standard requires no dummy bytes in the framer and has a fixed 68 frames in each superframe. The interleaver used in ADSL differs from that used in VDSL. The ADSL interleaver can be specified with a single parameter, the interleaver depth, D. In all other respects the ADSL frame is a subset of the VDSL frame. Thus the framer will produces and ADSL frame by setting Brs to 0, Dz to 0, Sfrm to 68 and interleaver depth D.

Similarly, the VDSL framer can support ADSL+ and ADSL2+ by setting Brs to 0, Dz to 0, Sfrm to SEQp, U is mapped to $(Tp*(Bp+1)-1)$, N is mapped to $(Mp*(Bp+1)+Rp)$, and P is mapped to Np/Sp. When Np/Sp is not an integer value, the parameter P may have to be changed from symbol to symbol, depending on the number of bits processed during that symbol. As with ADSL, the interleaver depth is set to D.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing embodiments of the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A multicarrier transceiver comprising:
a digital signal processor;
a framer that receives digital data over logical transmit channels having multiple channel types and processes the digital data using a single cascade of functional blocks, the framer including:
a scrambler;
a Reed-Solomon encoder configured to accept user and control data in one or more logical channels, partition the user and control data into one or more frames, randomize the user and control data through the scrambler, and multiplex the one or more logical channels into a single data stream; and
a first-in-first-out (FIFO) buffer configured to alter the user and control data in the one or more logical channels to enable processing on codeword boundaries; and
a configuration module, coupled between the digital signal processor and the framer, that routes data requests received from the scrambler, the Reed-Solomon encoder and the FIFO buffer and stores a plurality of programmable parameters each of which is programmed to a respective value according to a respective channel type to control operations of the framer.

2. The multicarrier transceiver of claim 1, wherein the configuration module stores at least a parameter I representative of a length of Very high bit-rate Digital Subscriber Line (VDSL) interleaving block, a parameter M representative of a VDSL interleaving depth, and a parameter A representative of an Asynchronous Digital Subscriber Line (ADSL) interleaving depth.

3. The multicarrier transceiver of claim 2, wherein the parameters I and M are set when the channel type is VDSL, and wherein the parameter A is set when the channel type is ADSL.

4. The multicarrier transceiver of claim 1, wherein the configuration module stores at least a parameter Brs representative of a Reed-Solomon dummy byte length, a parameter Dz representative of a payload dummy byte length, and a parameter Sform representative of a number of frames.

5. The multicarrier transceiver of claim 4, wherein each of the parameters Brs, Dz, and Sform is set to a respective value that is either zero or a positive integer when the channel type is Very high bit-rate Digital Subscriber Line (VDSL), wherein each of the parameters Brs, Dz, and Sform is set to zero when the channel type is Asynchronous Digital Subscriber Line (ADSL), and wherein each of the parameters Brs and Dz is set to zero and the parameter Sform is set to SEQp as defined in the ITU Recommendation G.992.5 when the channel type is a variation of ADSL.

6. The multicarrier transceiver of claim 1, wherein the configuration module stores at least a parameter E representative of a number of overhead bytes and a parameter U representative of a number of payload bytes.

7. The multicarrier transceiver of claim 6, wherein N sets of values of the parameters E and U are pre-computed and stored in a lookup table, and wherein N represents a number of Reed-Solomon codewords in a superframe such that each codeword in each superframe has a respective E number of overhead bytes and a respective U number of payload bytes to avoid computing the parameters E and U for each codeword of each superframe.

8. A multicarrier transceiver comprising:
a digital signal processor;
a deframer that receives a single stream of data, de-randomizes the data, and de-multiplexes the data into logical channels using a single cascade of functional blocks; and
a first configuration module, coupled between the digital signal processor and the deframer, that routes data requests received from the functional blocks of the deframer and stores a first plurality of programmable parameters each of which is programmed to a respective value according to a respective channel type to control operations of the deframer.

9. The multicarrier transceiver of claim 8, wherein the first configuration module stores at least a parameter I representative of a length of Very high bit-rate Digital Subscriber Line (VDSL) interleaving block, a parameter M representative of a VDSL interleaving depth, and a parameter A representative of an Asynchronous Digital Subscriber Line (ADSL) interleaving depth.

10. The multicarrier transceiver of claim 9, wherein the parameters I and M are set when the channel type is VDSL, and wherein the parameter A is set when the channel type is ADSL.

11. The multicarrier transceiver of claim 8, wherein the first configuration module stores at least a parameter Brs representative of a Reed-Solomon dummy byte length, a parameter Dz representative of a payload dummy byte length, and a parameter Sform representative of a number of frames.

12. The multicarrier transceiver of claim 11, wherein each of the parameters Brs, Dz, and Sform is set to a respective value that is either zero or a positive integer when the channel type is Very high bit-rate Digital Subscriber Line (VDSL), wherein each of the parameters Brs, Dz, and Sform is set to zero when the channel type is Asynchronous Digital Subscriber Line (ADSL), and wherein each of the parameters Brs and Dz is set to zero and the parameter Sform is set to SEQp as defined in the ITU Recommendation G.992.5 when the channel type is a variation of ADSL.

13. The multicarrier transceiver of claim 8, wherein the first configuration module stores at least a parameter E representative of a number of overhead bytes and a parameter U representative of a number of payload bytes.

14. The multicarrier transceiver of claim 13, wherein N sets of values of the parameters E and U are pre-computed and stored in a lookup table, and wherein N represents a number of Reed-Solomon codewords in a superframe such that each codeword in each superframe has a respective E number of overhead bytes and a respective U number of payload bytes to avoid computing the parameters E and U for each codeword of each superframe.

15. The multicarrier transceiver of claim 8, further comprising:
a framer that receives digital data over one or more other logical channels, partitions the received data into one or more frames, randomizes the data, and multiplexes the one or more other logical channels into another single stream of data; and a second configuration module, coupled between the digital signal processor and the framer, that routes data requests received from functional blocks of the framer and stores a second plurality of programmable parameters each of which is programmed to a respective value according to a respective channel type to control operations of the framer.

16. A multicarrier transceiver comprising:

a digital signal processor;

a framer that receives digital data over logical transmit channels having multiple channel types, the framer having a first cascade of framer functional blocks that processes the digital data, partitions the received data into one or more frames, randomizes the data, and multiplexes the logical transmit channels into a first single stream of data;

a first configuration module, coupled between the digital signal processor and the framer, that:

stores a first plurality of programmable parameters each of which is programmed to a respective value according to a respective channel type to control operations of the framer;

receives a data request from a first of the framer functional blocks that is processing one of the logical transmit channels;

selects a second of the framer functional blocks based on a channel type of the one of the logical transmit channels; and routes the data request from the first of the framer functional blocks to the second of the framer functional blocks;

a deframer that receives a second single stream of data, de-randomizes the data, and de-multiplexes the data into logical receive channels having multiple channel types, the deframer having a second cascade of deframer functional blocks for processing the second single stream of data; and a second configuration module, coupled between the digital signal processor and the deframer, that:

stores a second plurality of programmable parameters each of which is programmed to a respective value according to a respective channel type to control operations of the deframer;

receives a data request from a first of the deframer functional blocks that is processing one of the logical receive channels;

selects a second of the deframer functional blocks based on a channel type of the one of the logical receive channels; and routes the data request from the first of the deframer functional blocks to the second of the deframer functional blocks.

17. The multicarrier transceiver of claim 16, wherein the first configuration module stores at least a parameter Brs representative of a Reed-Solomon dummy byte length, a parameter Dz representative of a payload dummy byte length, and a parameter Sform representative of a number of frames.

18. The multicarrier transceiver of claim 17, wherein each of the parameters Brs, Dz, and Sform is set to a respective value that is either zero or a positive integer when the channel type is Very high bit-rate Digital Subscriber Line (VDSL), wherein each of the parameters Brs, Dz, and Sform is set to zero when the channel type is Asynchronous Digital Subscriber Line (ADSL), and wherein each of the parameters Brs and Dz is set to zero and the parameter Sform is set to SEQp as defined in the ITU Recommendation G.992.5 when the channel type is a variation of ADSL.

19. The multicarrier transceiver of claim 16, wherein the first configuration module stores at least a parameter E representative of a number of overhead bytes and a parameter U representative of a number of payload bytes.

20. The multicarrier transceiver of claim 19, wherein N sets of values of the parameters E and U are pre-computed and stored in a lookup table, and wherein N represents a number of Reed-Solomon codewords in a superframe such that each codeword in each superframe has a respective E number of overhead bytes and a respective U number of payload bytes to avoid computing the parameters E and U for each codeword of each superframe.

* * * * *